United States Patent
Nicolls et al.

(10) Patent No.: US 11,592,549 B2
(45) Date of Patent: Feb. 28, 2023

(54) CALIBRATING RADARS AND TRACKING SPACE OBJECTS

(71) Applicant: LeoLabs, Inc., Menlo Park, CA (US)

(72) Inventors: Michael Nicolls, Portola Valley, CA (US); John Buonocore, Redwood City, CA (US); Daniel Ceperley, Redwood City, CA (US); Edward Lu, Saratoga, CA (US); Steven Chen, Mountain View, CA (US); Christopher Rosner, Redwood City, CA (US); Matthew Stevenson, San Jose, CA (US); Craig Trumbull, San Francisco, CA (US); Gerald Wong, Cupertino, CA (US); Matthew Adelman, Palo Alto, CA (US); Inkwan Park, Menlo Park, CA (US); Nathan Griffith, Damascus, OR (US); Sanado Barolli, Hayward, CA (US)

(73) Assignee: LeoLabs, Inc., Menlo Park, CA (US)

(*) Notice: Subject to any disclaimer, the term of this patent is extended or adjusted under 35 U.S.C. 154(b) by 0 days.

(21) Appl. No.: 17/767,209

(22) PCT Filed: Oct. 11, 2020

(86) PCT No.: PCT/US2020/055177
§ 371 (c)(1),
(2) Date: Apr. 7, 2022

(87) PCT Pub. No.: WO2021/072347
PCT Pub. Date: Apr. 15, 2021

(65) Prior Publication Data
US 2022/0350012 A1    Nov. 3, 2022

Related U.S. Application Data

(60) Provisional application No. 62/914,304, filed on Oct. 11, 2019.

(51) Int. Cl.
*G01S 13/72* (2006.01)
*H01Q 3/30* (2006.01)
(Continued)

(52) U.S. Cl.
CPC ............. *G01S 13/72* (2013.01); *G01S 7/40* (2013.01); *H01Q 3/30* (2013.01); *H01Q 19/175* (2013.01)

(58) Field of Classification Search
CPC .. G01S 13/72; G01S 7/40; H01Q 3/30; H01Q 19/175
(Continued)

(56) References Cited

U.S. PATENT DOCUMENTS 8,207,891 B1 * 6/2012 Lam ................... H01Q 21/0087
342/368
8,604,989 B1 * 12/2013 Olsen ...................... H01Q 3/40
343/754

(Continued)

FOREIGN PATENT DOCUMENTS

AU    2016246770 A1 * 11/2017 ......... H01Q 15/0013
EP       3470875 A1 *  4/2019 ......... G01S 13/4463

OTHER PUBLICATIONS

H. Wilden, et al. "GESTRA—A phased-array based surveillance and tracking radar for space situational awareness," 2016 IEEE International Symposium on Phased Array Systems and Technology (PAST), 2016, pp. 1-5, doi: 10.1109/ARRAY.2016.7832621 (Year: 2016).*

(Continued)

*Primary Examiner* — Vladimir Magloire
*Assistant Examiner* — Alexander L. Syrkin
(74) *Attorney, Agent, or Firm* — Dentons US LLP

(57) ABSTRACT

Technologies for calibrating radars and tracking space objects. Some of such technologies enable a technique for (Continued)

calibrating a radar based on using -A- an elemental antenna (308), which can be embedded on a housing hosting a set of antenna elements, or -B- an antenna (146) mounted to a reflector. Some of such technologies enable a radar site containing a first 1D phased array (112) and a second 1D phased array (112), where the first 1D phased array sends a set of signals and receives a set of reflections based on the set of signals, and the second 1D phased array receives the set of reflections.

26 Claims, 33 Drawing Sheets

(51) Int. Cl.
    *H01Q 19/17*     (2006.01)
    *G01S 7/40*     (2006.01)

(58) Field of Classification Search
    USPC ......................................................... 342/146
    See application file for complete search history.

(56) References Cited

U.S. PATENT DOCUMENTS

| | | | |
|---|---|---|---|
| 2017/0045613 A1* | 2/2017 | Wang | G01S 13/343 |
| 2017/0214145 A1* | 7/2017 | Elad | H01Q 19/175 |
| 2018/0131101 A1* | 5/2018 | Evtyushkin | H01Q 3/30 |
| 2019/0064338 A1* | 2/2019 | Holt | H01Q 1/525 |

OTHER PUBLICATIONS

International Search Report and Written Opinion dated Jan. 19, 2021 for International Application PCT/US2020/055177 filed Oct. 11, 2020 (12 pages).

Wilden et al., GESTRA—A Phased-Array based surveillance and tracking Radar for Space Situational Awareness, IEEE, 2016 (5 pages).

* cited by examiner

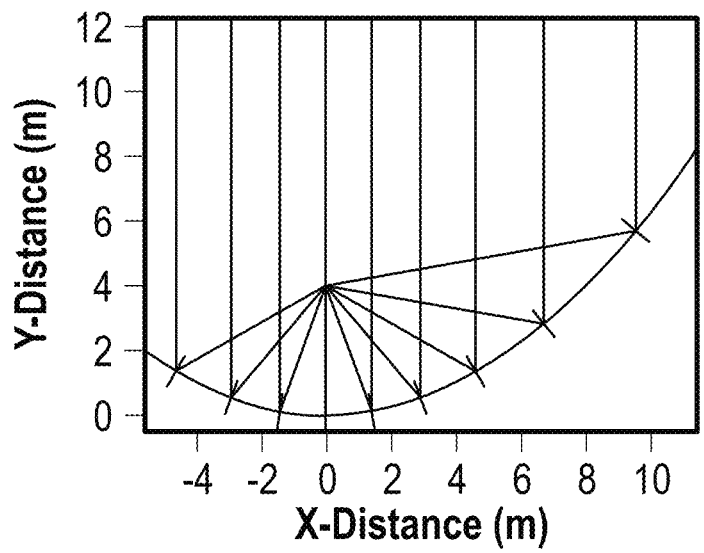
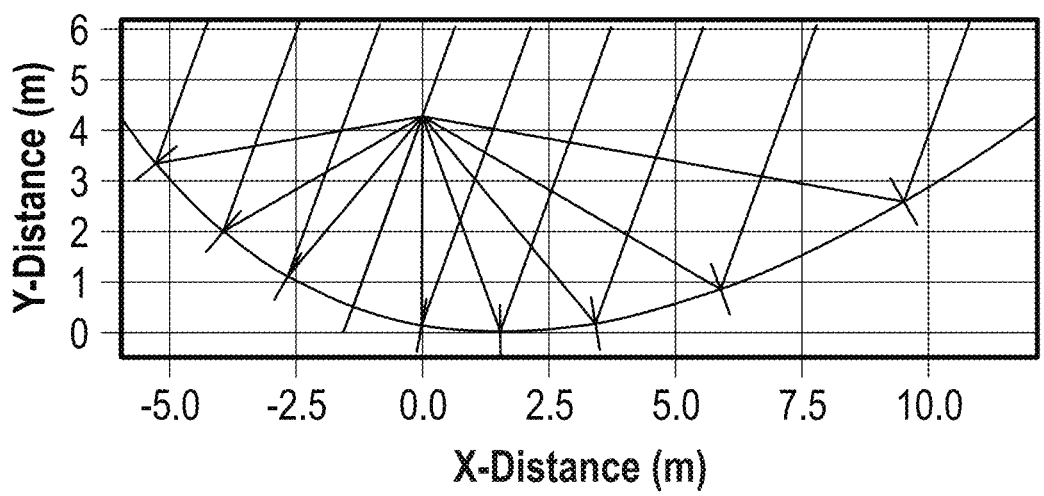
FIG. 6

Overview

1. Initial Orbit Determination (IOD)
   1) determine an orbit with no a priori information,
   2) depends only on measurements, 2. When is the algorithm required?
   1) determine orbits for unknown (uncatalogued) objects,
   2) reinitialize orbits for known objects with no measurements for a while

FIG. 14

Initial Orbit Determination Procedure

FIG. 16

IOD Procedure

1. Get tracklets from both troughs,

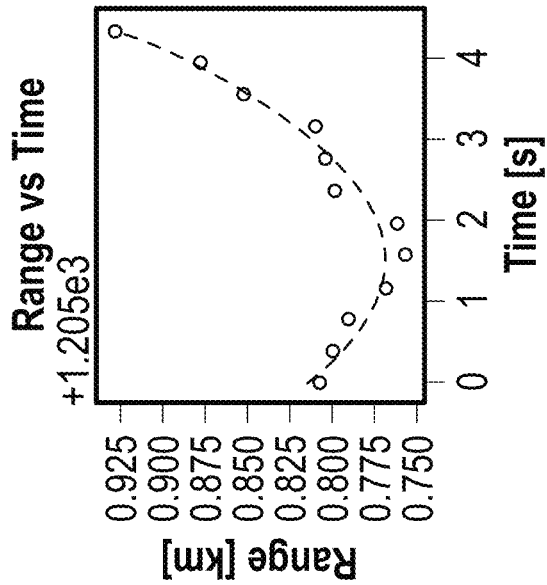
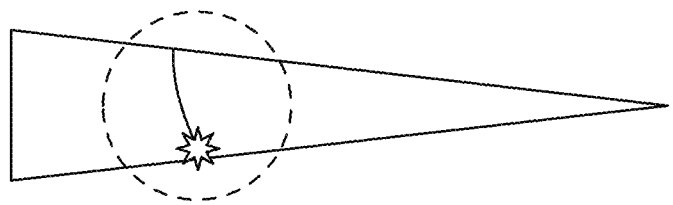
IOD Procedure
1. Get tracklets from both troughs,
2. Select the best candidate from each tracklet (dynamical meas. fitter),
FIG. 18

IOD Procedure

1. Get tracklets from both troughs,
2. Select the best candidate from each tracklet (dynamical meas. fitter),
3. Guess an initial orbit,

IOD Procedure

1. Get tracklets from both troughs,
2. Select the best candidate from each tracklet (dynamical meas. filter),
3. Guess an initial orbit,
4. Minimize cost function with regularized Batch LSQ

Software Architecture

Software Architecture

1. The IOD algorithm consists of two python scripts, written only for IOD, and frame_conversion.py in the backend,
   1) "*test_leolabs_iod.py*" : file path, basic setting, I/O, function calls,
   2) "*leolabs_iod_utils.py*" :
      a) Time format conversion,
      b) Orbit expression conversion,
      c) Cost function minimization,
      d) Residual calculation,
      e) Etc.

2. KSR measurements from the API measurements json
   1) "*arrange_api_measurements_for_ksr_iod.py*"

FIG. 22

CALIBRATING RADARS AND TRACKING SPACE OBJECTS

CROSS-REFERENCE TO RELATED PATENT APPLICATIONS

This patent application claims a benefit of PCT International Application PCT/US2020/055179 filed 11 Oct. 2020; which claims a benefit of U.S. Provisional Patent Application 62/914,304 filed 11 Oct. 2019; which is herein fully incorporated by reference for all purposes.

TECHNICAL FIELD

This disclosure relates to calibrating radars and tracking space objects.

BACKGROUND

There are various ways to track various space objects (e.g., low earth objects, satellites, debris). For example, some space objects can be tracked via 2D phased array radars. However, these systems are technologically disadvantageous because of large size, technological complexity, and high financial costs. Some of such technological disadvantages can be overcome by steerable dish radars. However, these systems are technologically disadvantageous because of low tracking rates, mechanical steering, and limited beaming abilities.

SUMMARY

Generally, this disclosure enables various technologies for calibrating radars and tracking space objects. For example, some of such technologies enable a technique for calibrating a radar based on using (a) an elemental antenna, which can be embedded on a housing hosting a set of antenna elements, or (b) an antenna mounted to a reflector. For example, some of such technologies enable a radar site containing a first 1D phased array and a second 1D phased array, where the first 1D phased array sends a set of signals and receives a set of reflections based on the set of signals, and the second 1D phased array receives the set of reflections.

In an embodiment, a system comprises: a defined area; a first frame positioned within the defined area; a first trough reflector positioned within the defined area, wherein the first trough reflector is secured to the first frame, wherein the first trough reflector has a first shape, a first longitudinal valley, and a first scale; a first 1D phased array positioned within the defined area, wherein the first 1D phased array is supported by the first frame over the first trough reflector such that the first 1D phased array sends a set of signals via the first trough reflector and receives a set of reflections based on the set of signals via the first trough reflector; a second frame positioned within the defined area; a second trough reflector positioned within the defined area, wherein the second trough reflector is secured to the second frame, wherein the second trough reflector has a second shape, a second longitudinal valley, and a second scale, wherein the second shape is the first shape, wherein the second longitudinal valley is parallel to the first longitudinal valley, wherein the second scale is lesser than the first scale; and a second 1D phased array positioned within the defined area, wherein the second 1D phased array is supported by the second frame over the second trough reflector such that the second 1D phased array does not send any signals via the second trough reflector and receives the set of reflections based on the set of signals via the second trough reflector.

DESCRIPTION OF DRAWINGS

FIGS. 2-7 show a plurality of diagrams of the radar site according to this disclosure.

FIGS. 14-31 show an embodiment of a process for determining an initial orbit determination and a software architecture therefor according to this disclosure.

DETAILED DESCRIPTION

Figure 1:
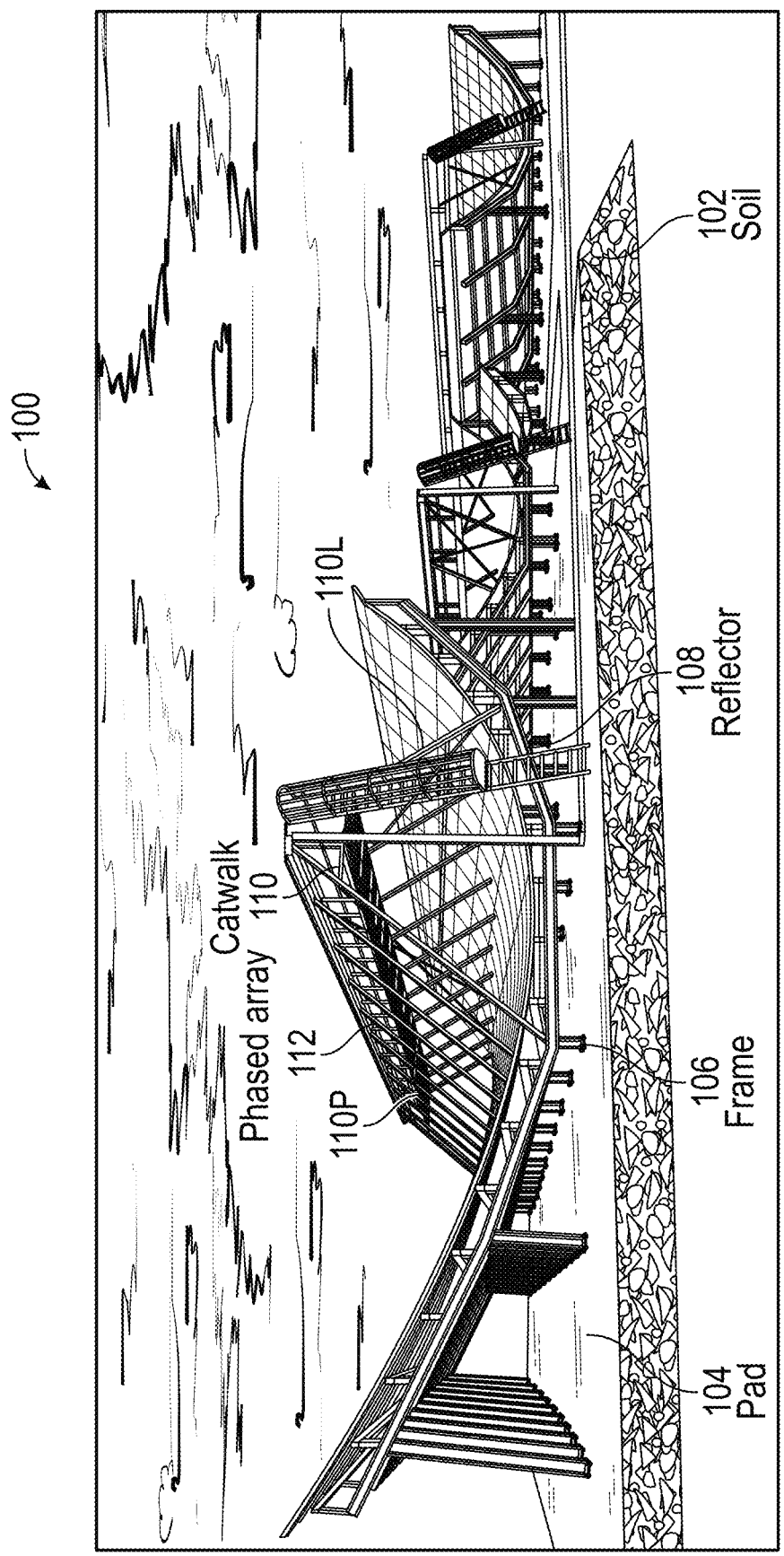
FIG. 1 shows an embodiment of a radar site according to this disclosure.

Generally, this disclosure enables various technologies for calibrating radars and tracking space objects. For example, some of such technologies enable a technique for calibrating a radar based on using (a) an elemental antenna, which can be embedded on a housing hosting a set of antenna elements, or (b) an antenna mounted to a reflector. For example, some of such technologies enable a radar site containing a first 1D phased array and a second 1D phased array, where the first 1D phased array sends a set of signals and receives a set of reflections based on the set of signals, and the second 1D phased array receives the set of reflections. This disclosure is now described more fully with reference to FIGS. 1-33, in which various embodiments of this disclosure are shown. This disclosure can be embodied in many different forms and should not be construed as necessarily being limited to the embodiments disclosed herein. Rather, the embodiments are provided so that this disclosure is thorough and complete, and fully conveys various concepts of this disclosure to those skilled in a relevant art.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, then there are no intervening elements present.

Various terminology used herein is for describing embodiments and is not intended to be necessarily limiting of this disclosure. As used herein, various singular forms "a," "an"

and "the" are intended to include various plural forms as well, unless specific context clearly indicates otherwise. Various terms "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms, such as "below," "lower," "above," and "upper," can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms, such as "below" and "lower," can encompass both an orientation of above and below.

As used herein, a term "about" or "substantially" refers to a +/−10% variation from a nominal value/term. Such variation is always included in any given value/term provided herein, whether or not such variation is specifically referred thereto.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain embodiments can be combined and sub-combined in and/or with various other embodiments. Also, different aspects and/or elements of embodiments, as disclosed herein, can be combined and sub-combined in a similar manner as well. Further, some embodiments, whether individually and/or collectively, can be components of a larger system, wherein other procedures can take precedence over and/or otherwise modify their application. Additionally, a number of steps can be required before, after, and/or concurrently with embodiments, as disclosed herein. Note that any and/or all methods and/or processes, at least as disclosed herein, can be at least partially performed via at least one entity in any manner.

Embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various embodiments of this disclosure should not be construed as necessarily limited to various shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three-dimensional (3D) printing, laser cutting, computer numerical control routing, milling, pressing, stamping, vacuum forming, hydroforming, injection molding, lithography, and so forth.

Figure 7:
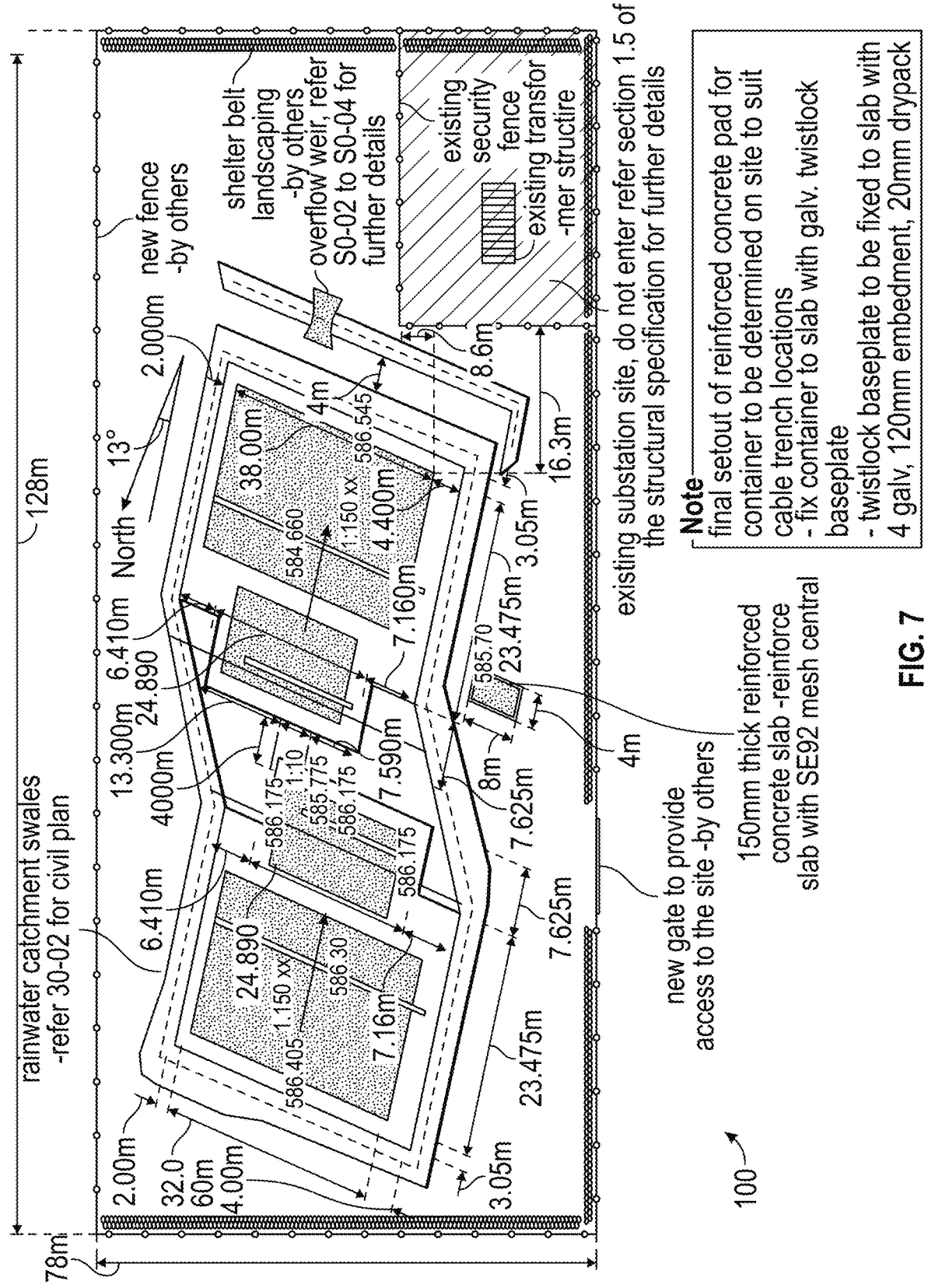
Figure 8:
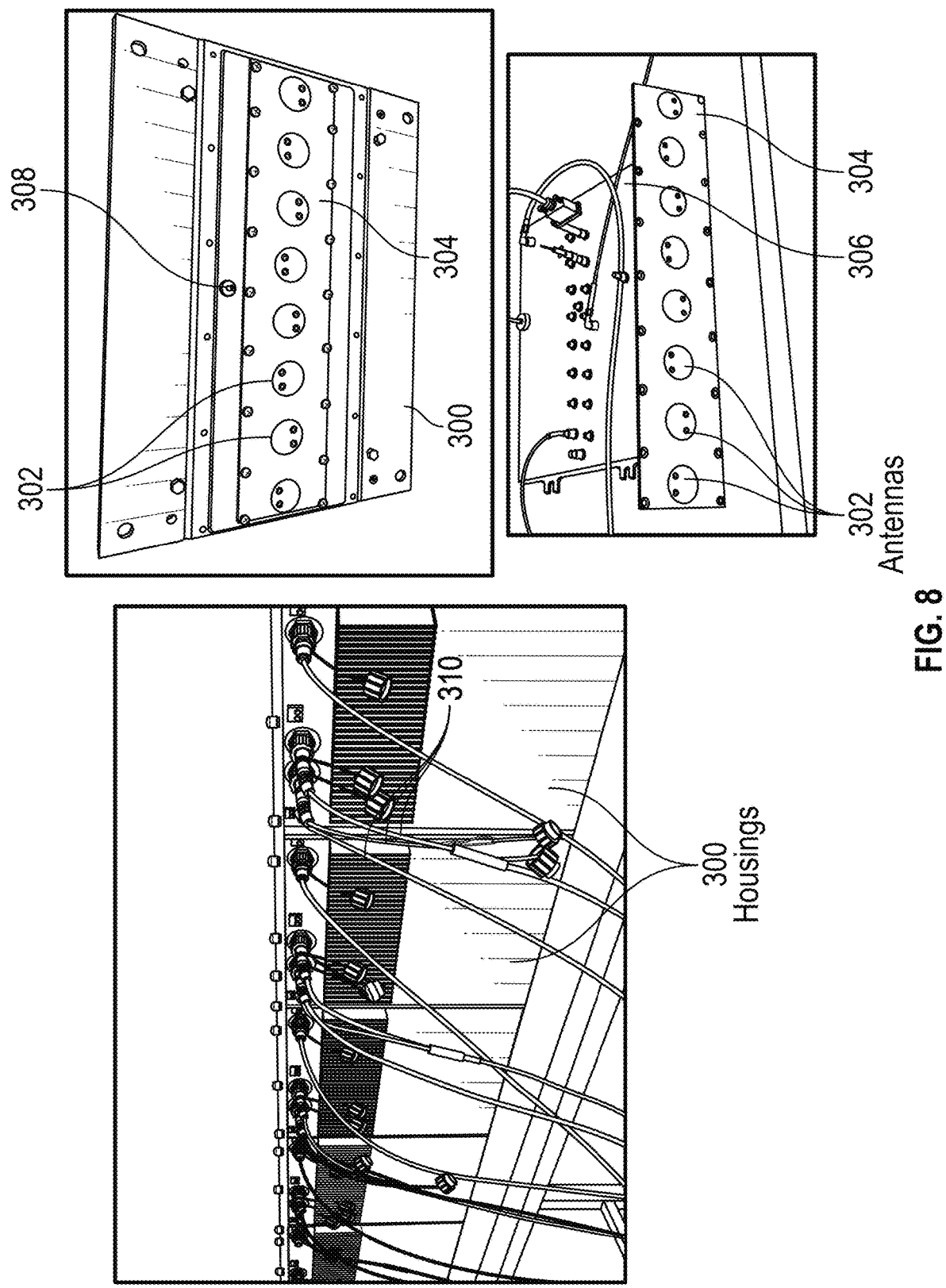
FIG. 8 shows a plurality of embodiments of a plurality of transmit or receive assemblies according to this disclosure.
Figure 9:
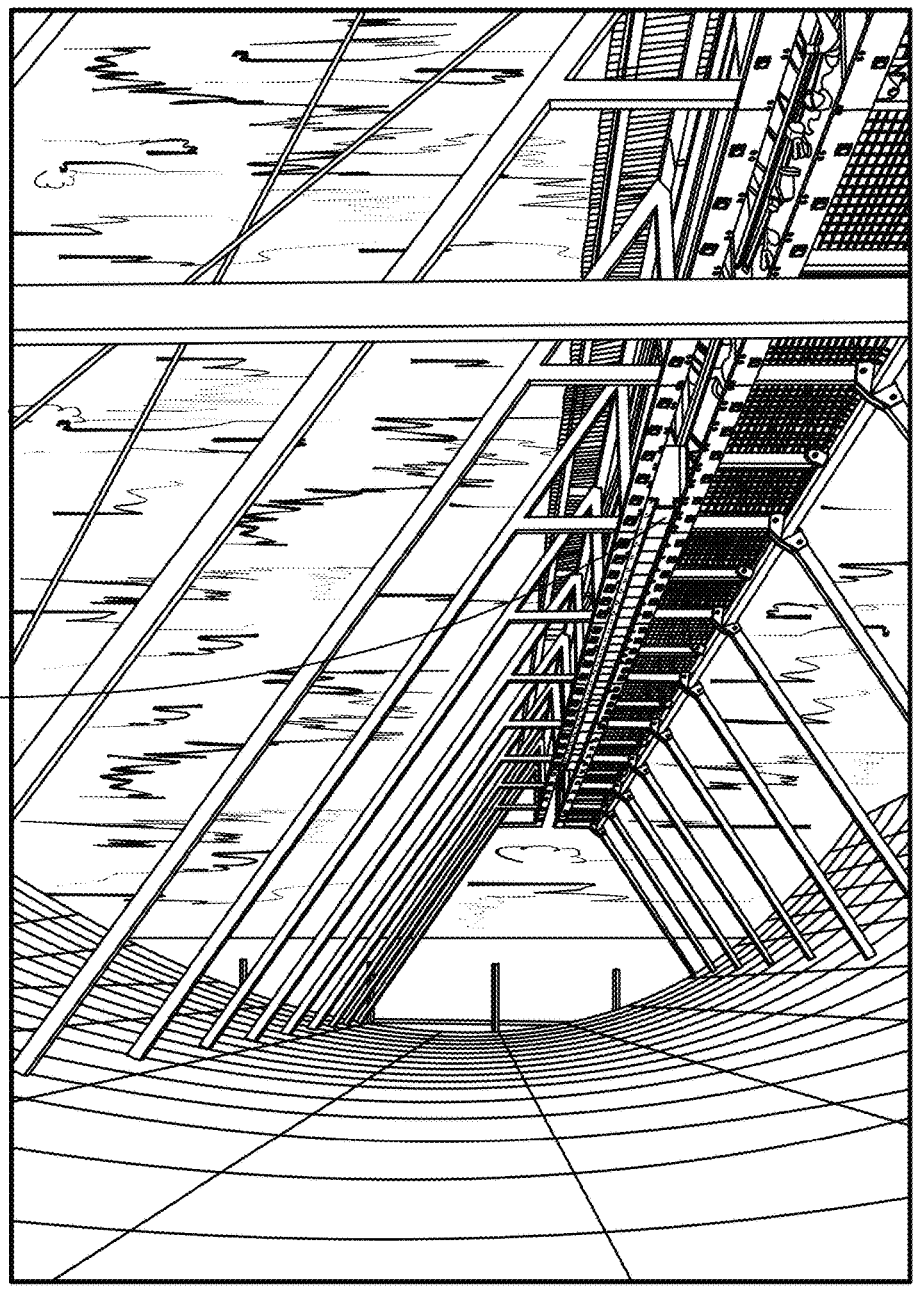
FIG. 9 shows an embodiment of a plurality of transmit or receive assemblies supported via a catwalk according to this disclosure.
Figure 10:
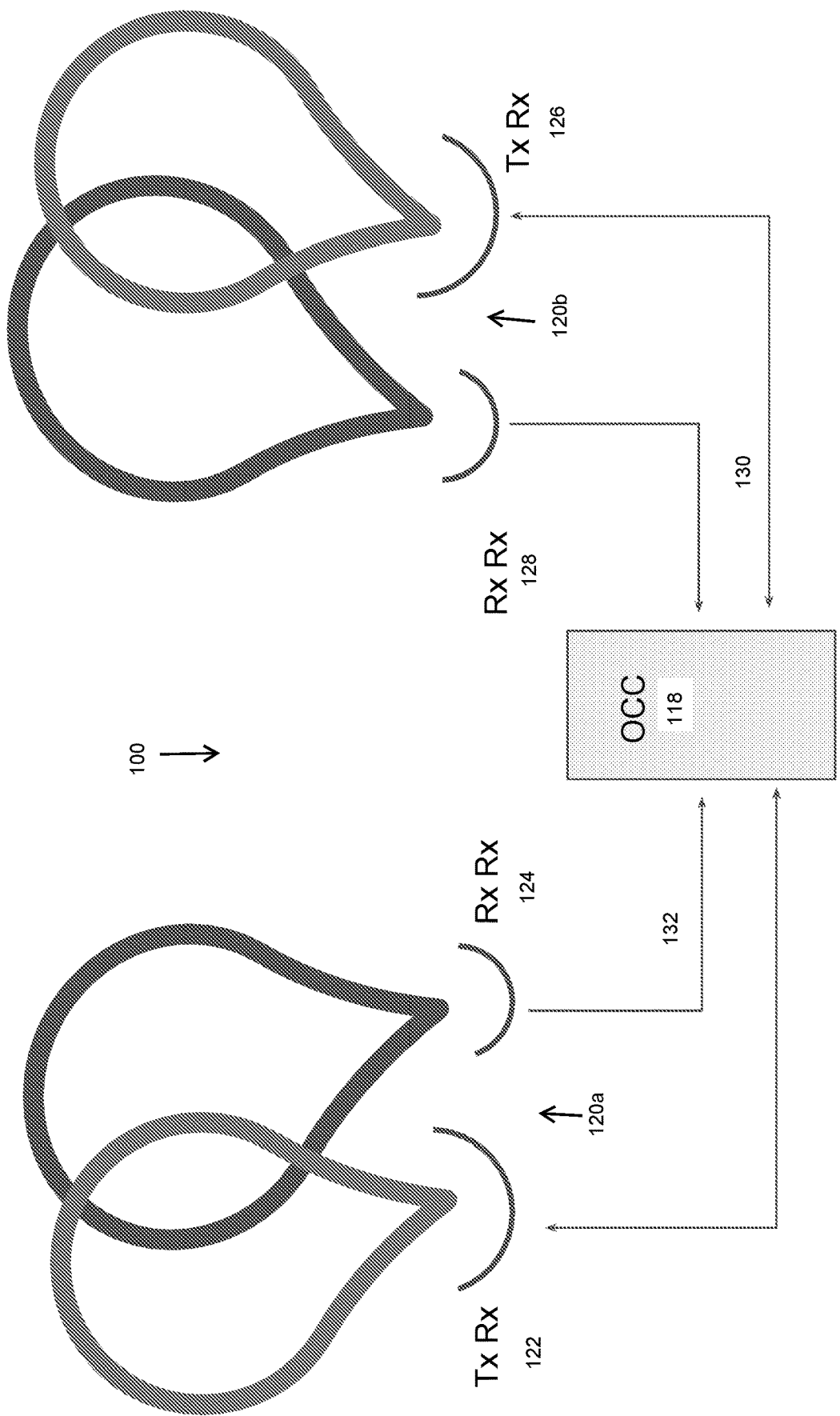
FIG. 10 shows an embodiment of a diagram of the radar site according to this disclosure.
Figure 11:
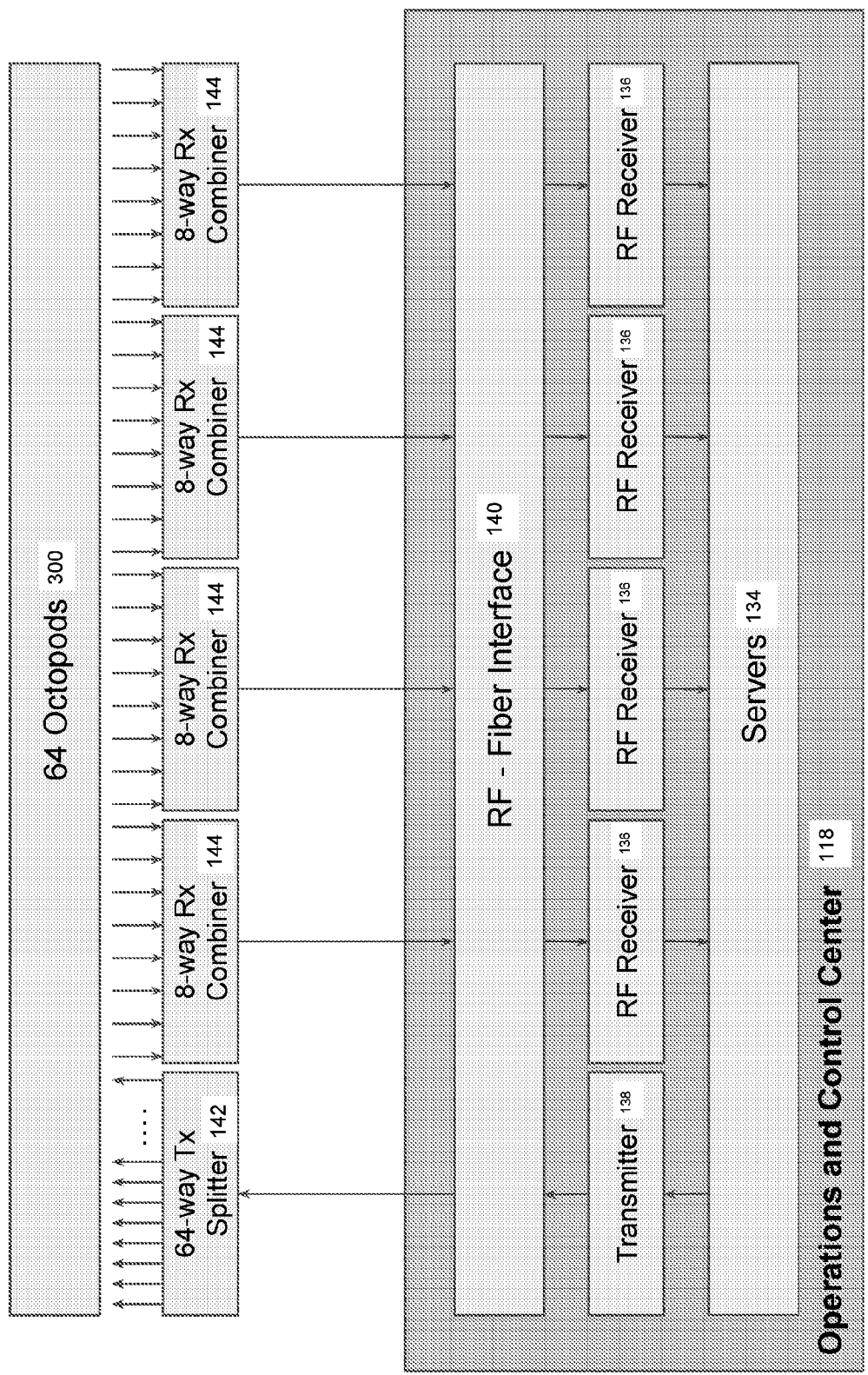
FIG. 11 shows an embodiment of a diagram of an operations and control center and a 1D phased array according to this disclosure.
Figure 12:
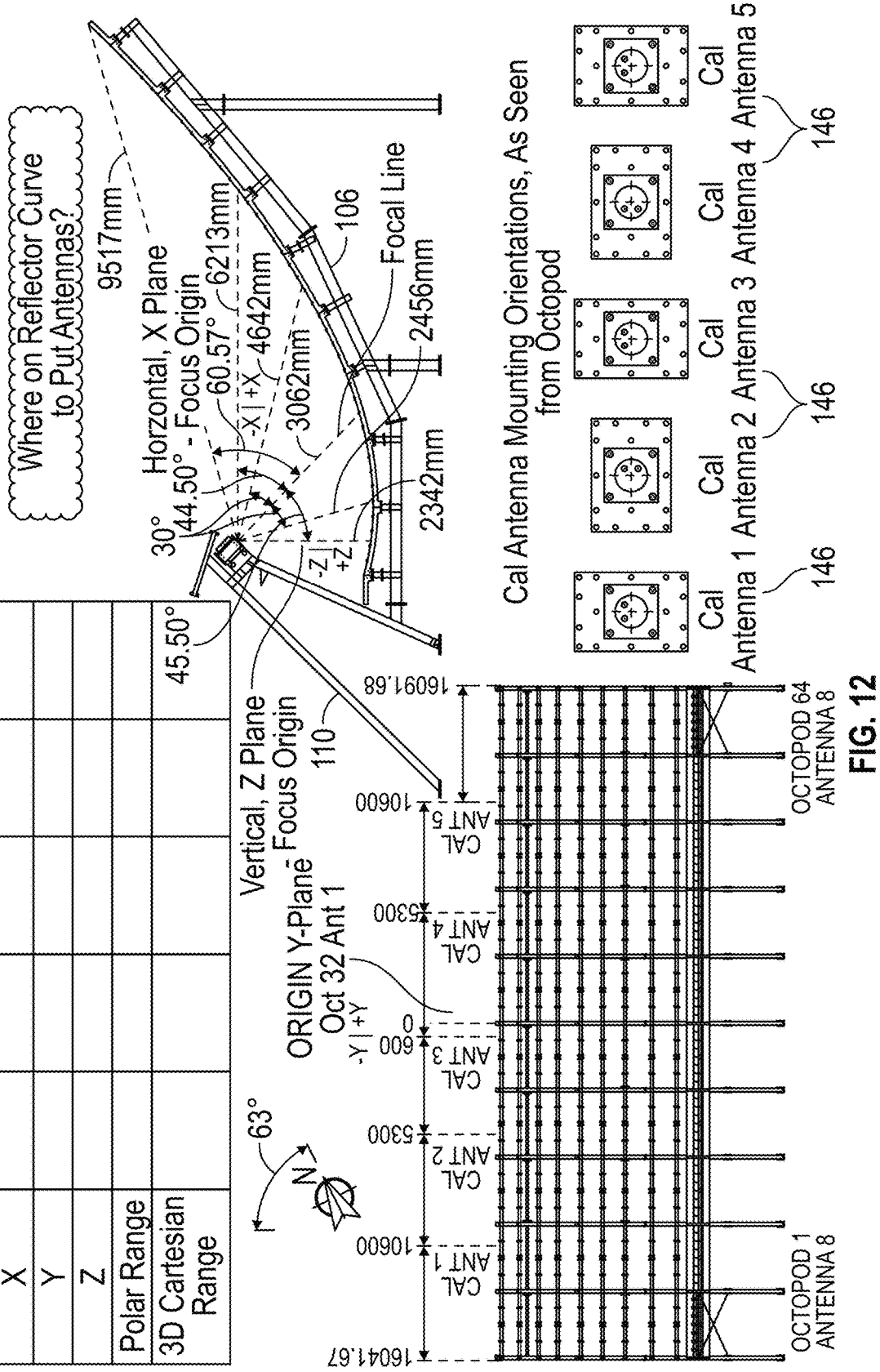
FIG. 12 shows an embodiment of a frame supporting a 1D phased array over a trough reflector according to this disclosure.
Figure 13:
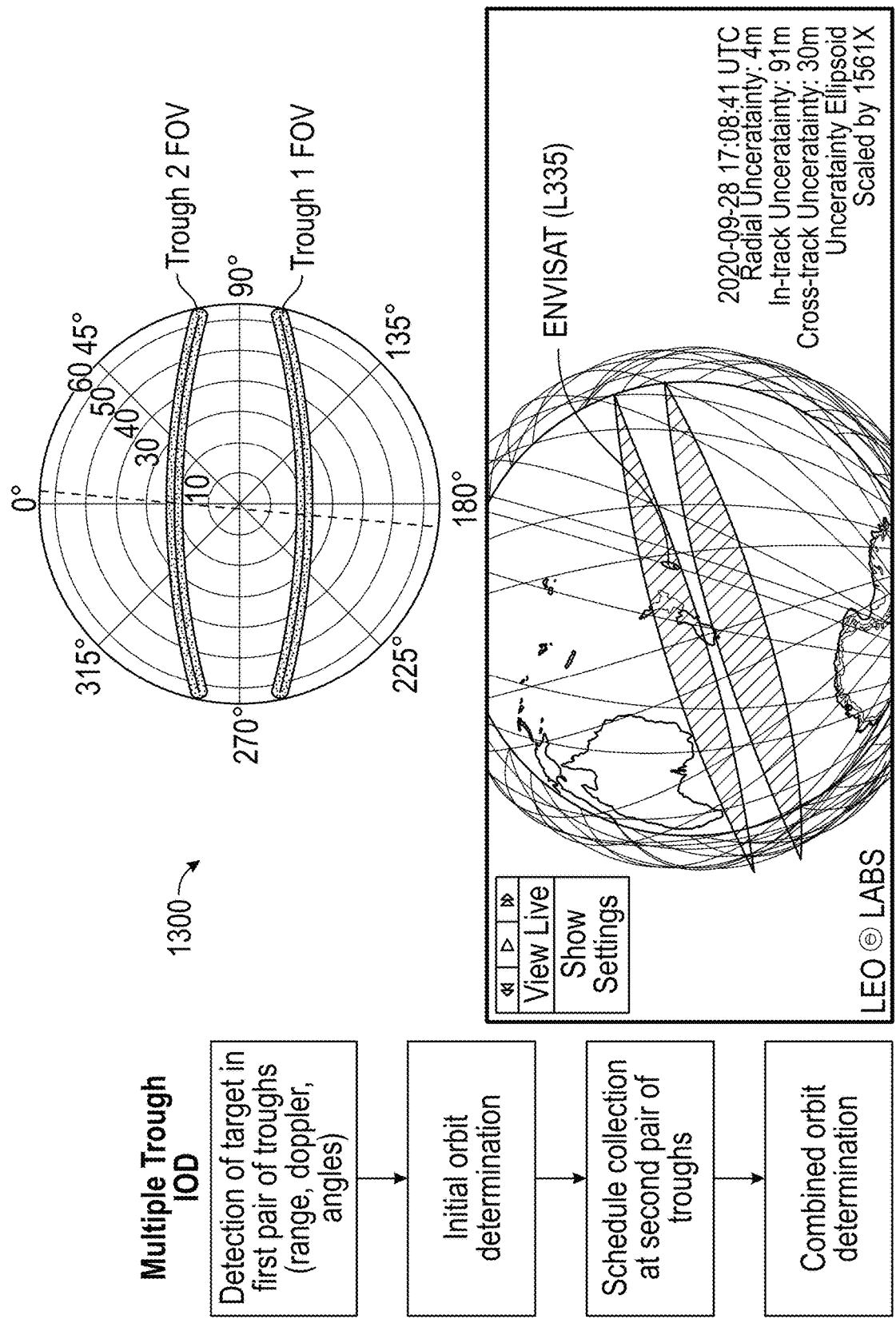
FIG. 13 shows an embodiment of a process for determining an initial orbit determination in light of a pair of diagrams indicating a trajectory of a satellite intersecting a first field of view and a second field of view according to this disclosure.
Figure 15:
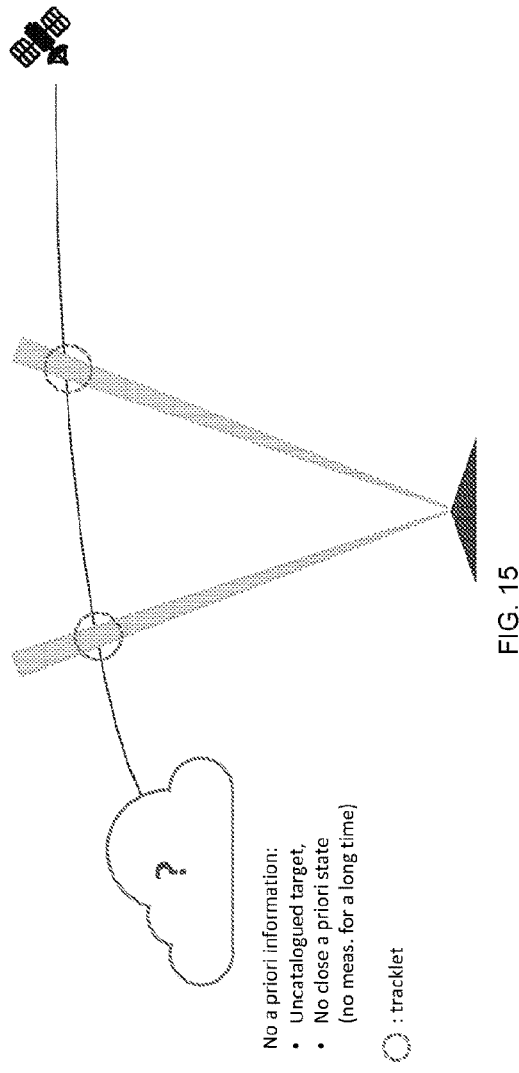
Figure 17:
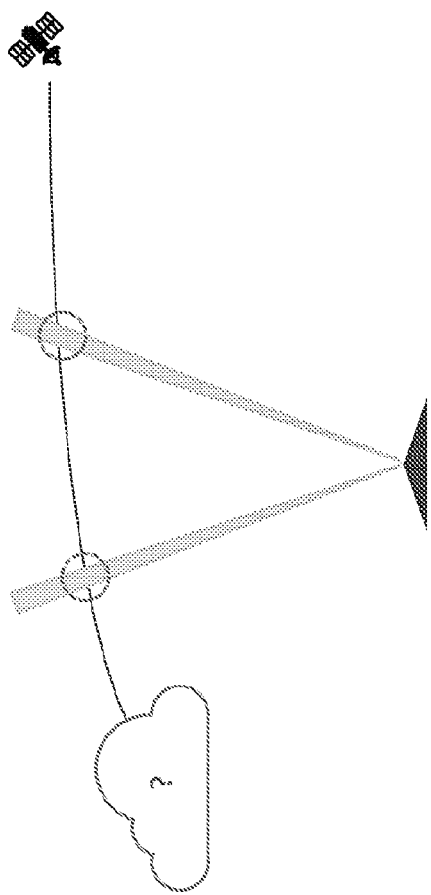
Figure 19:
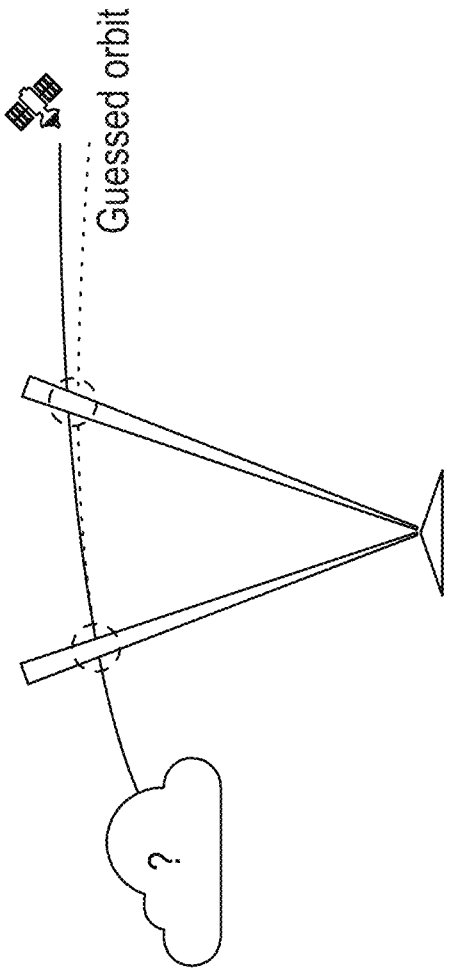
Figure 20:
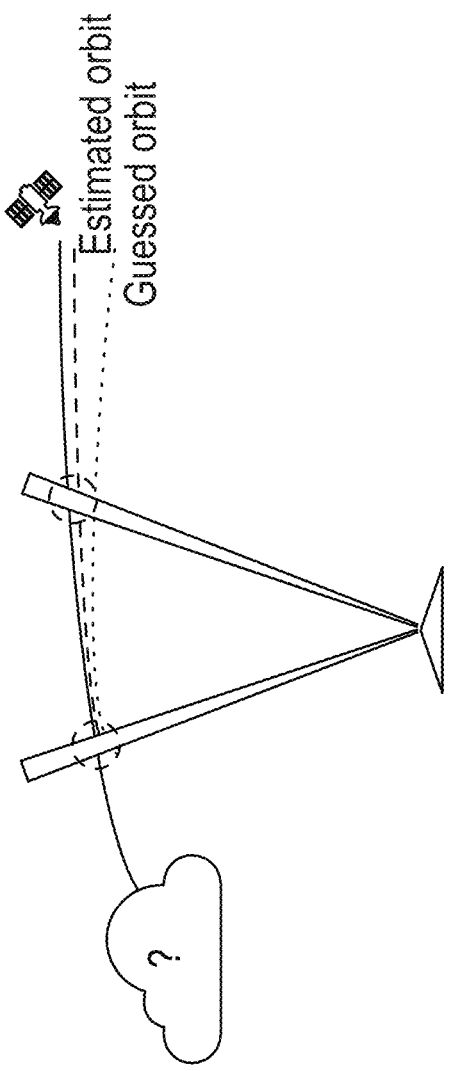
Figure 21:
Figure 32:
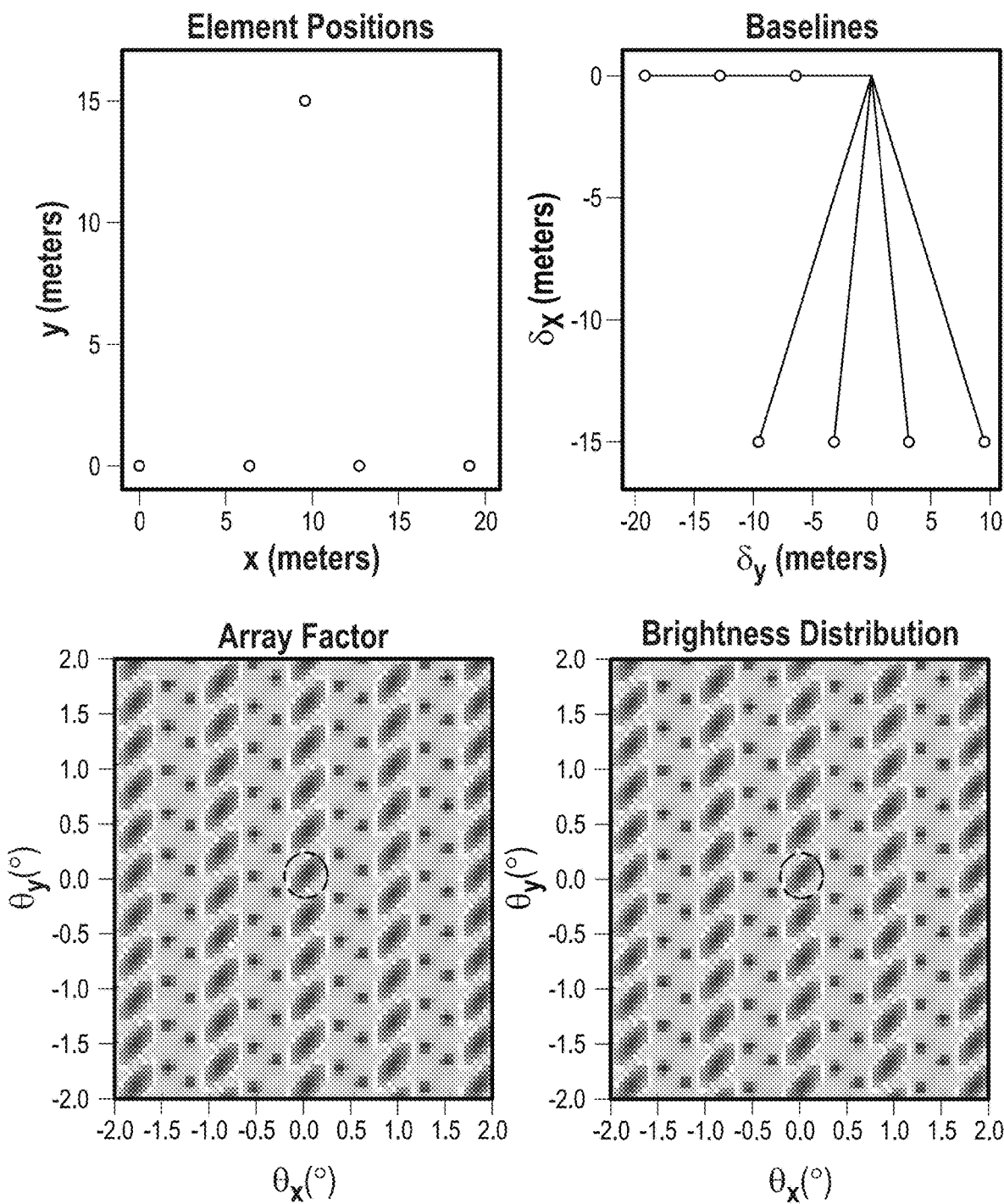
FIGS. 32-33 show an embodiment of an interferometry technique according to this disclosure.
Figure 33:
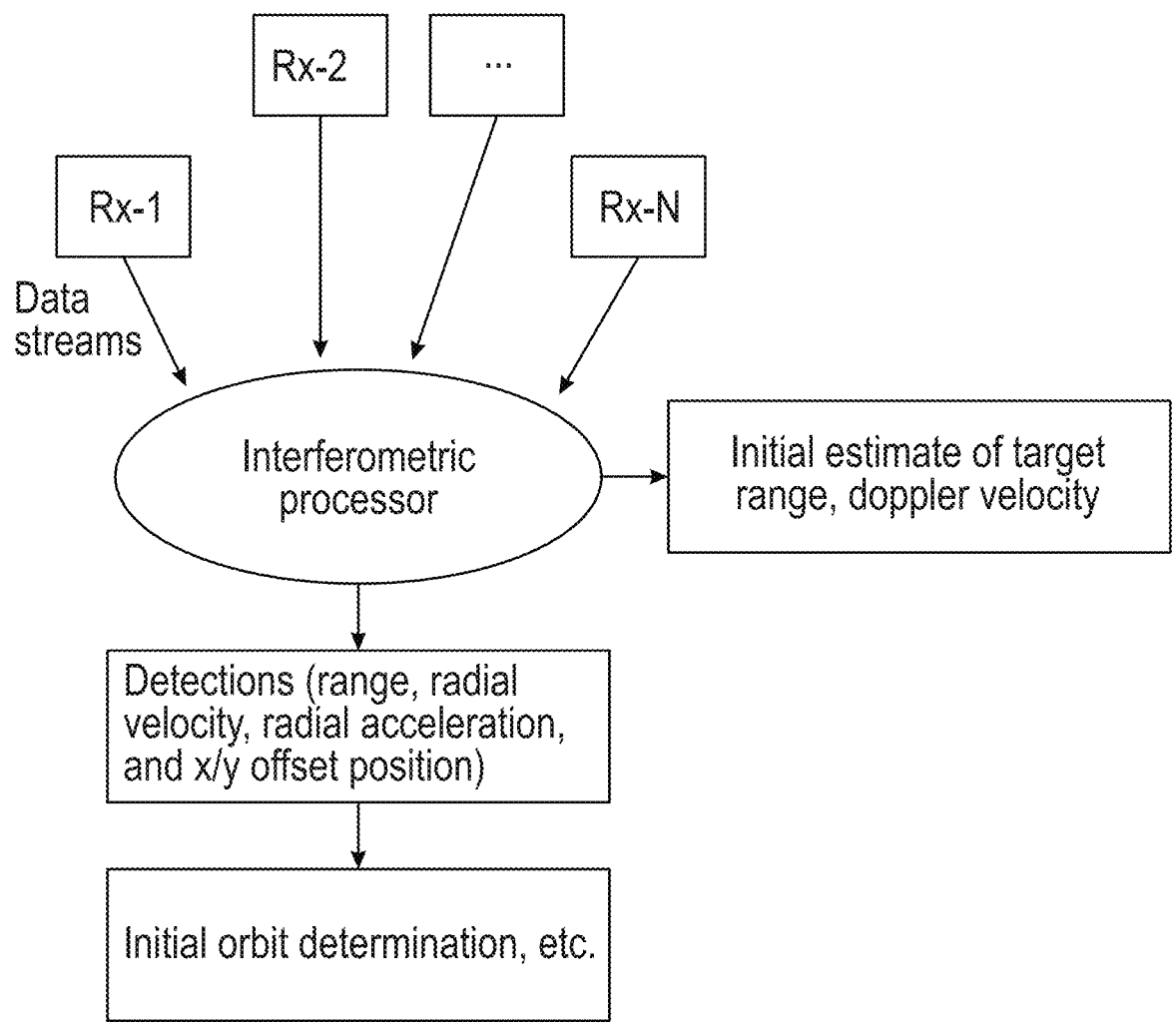

FIG. 1 shows an embodiment of a radar site according to this disclosure. FIGS. 2-7 show a plurality of diagrams of the radar site according to this disclosure. FIG. 8 shows a plurality of embodiments of a plurality of transmit or receive assemblies according to this disclosure. FIG. 9 shows an embodiment of a plurality of transmit or receive assemblies supported via a catwalk according to this disclosure. FIG. 10 shows an embodiment of a diagram of the radar site according to this disclosure. FIG. 11 shows an embodiment of a diagram of an operations and control center and a 1D phased array according to this disclosure. FIG. 12 shows an embodiment of a frame supporting a 1D phased array over a trough reflector according to this disclosure. FIG. 13 shows an embodiment of a process for determining an initial orbit determination in light of a pair of diagrams indicating a trajectory of a satellite intersecting a first field of view and a second field of view according to this disclosure. FIGS. 14-31 show an embodiment of a process for determining an initial orbit determination, a software architecture therefor, and a comparison between a result for determining an orbit of a space object using a TLE technique and a result for determining the orbit of the space object using an initial orbit determination technique according to this disclosure. FIGS. 32-33 show an embodiment of an interferometry technique according to this disclosure.

Figure 2:
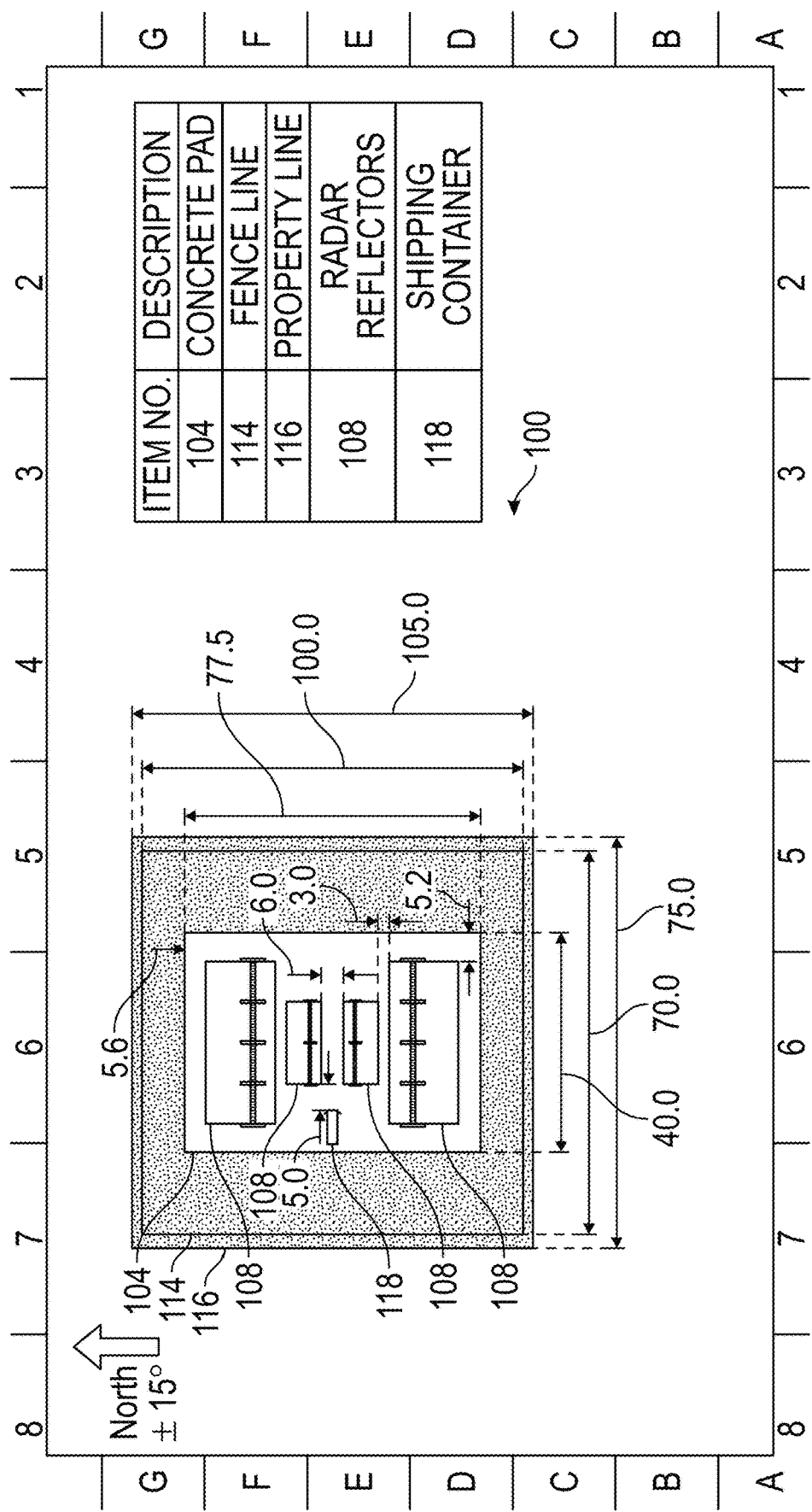

A defined area 100 (e.g., a radar site, an enclosed area, a fenced area) has a volume of soil 102 and a pad 104 (e.g., concrete, rubber), where the volume of soil 102 supports the pad 104. As shown in FIG. 2, the defined area 100 has a fence line 114 surrounded by a property line 116. The volume of soil 102 rests on a ground surface, although this can be omitted. The pad 104 hosts a first radar pair 120*a* and a second radar pair 120*b*.

Figure 5:
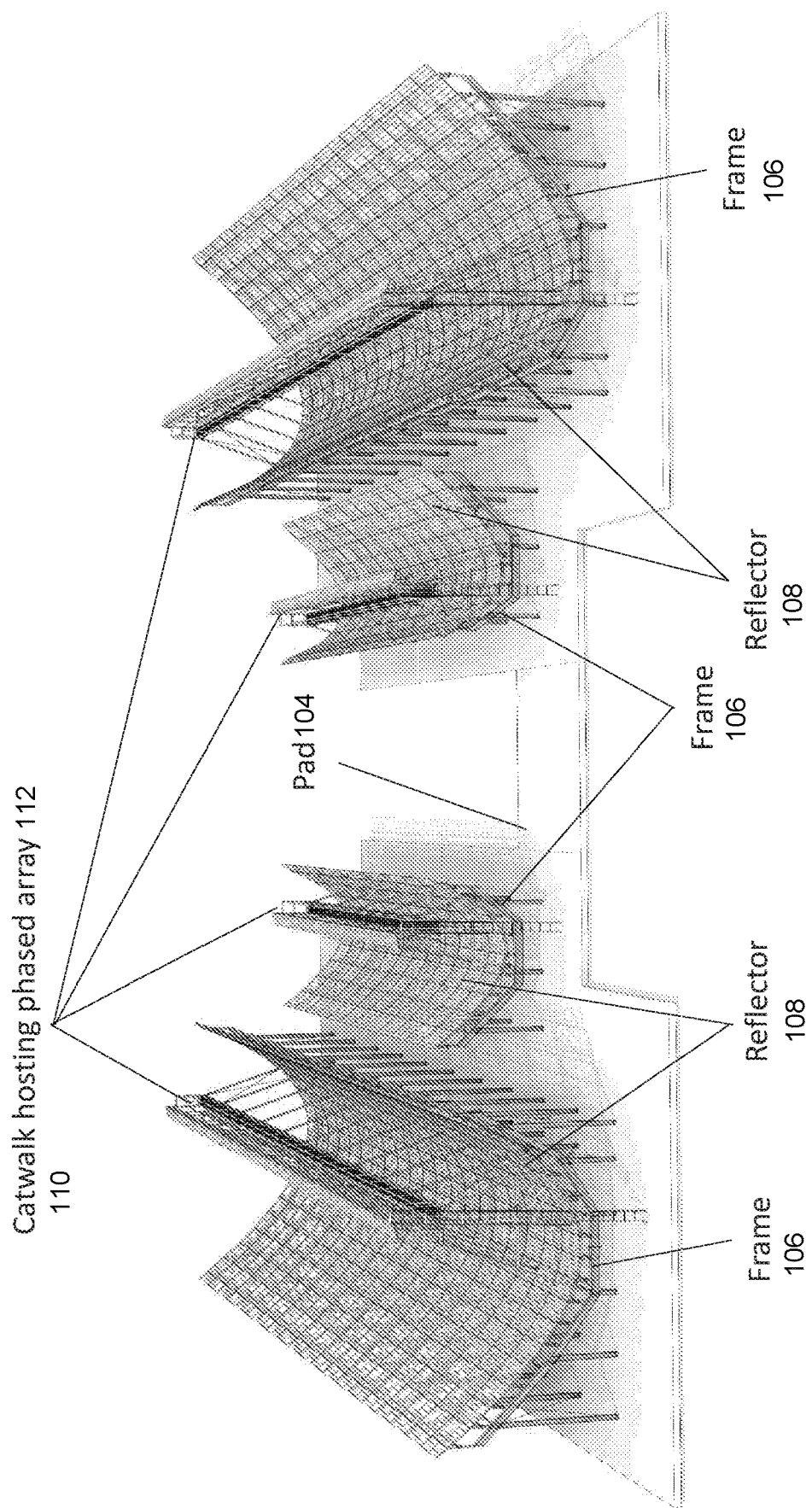

As shown in FIG. 5, the pad 104 has a first island supporting the first radar, a second island supporting the second radar, and a bridge spanning between the first island and the second island. As shown in FIG. 7, the pad 104 is arranged such that the first island and the second island are offset relative to each other (for tracking purposes). However, note that these configurations can vary. For example, the bridge can be omitted, the first island and the second island can be not offset, or the pad 104 can be omitted.

The first radar pair 120a includes a first radar having a first frame 106, a first trough reflector 108 (also called a parabolic cylinder antenna, a parabolic cylindrical antenna, or a parabolic trough antenna), a first catwalk 110, and a first 1D phased array 110. The first frame 106 (e.g., U-shape or C-shape with a set of supporting legs) is positioned within the defined area 100. The first trough reflector 108 is positioned within the defined area 100, secured (e.g., fastened) to the first frame 106, and has a first shape (e.g., U-shape, C-shape), a first longitudinal valley (e.g., extending in a Z-dimension of FIGS. 1, 4, 5), and a first scale (e.g., a size). For example, the first trough reflector 108 can by formed by a group of panels (e.g., metal, alloys, steel, mesh, grid) positioned immediately adjacent to each other to form an upper surface that is configured to reflect various signals (e.g., radio, light). For example, when at least some the panels are mesh panels having holes therein (e.g., contributes to low cost), then the holes may be sized to be smaller than an operating wavelength of the first 1D phased array 110. For example, small aperture mesh provides high reflectivity and low leakage. Signal leakage through the mesh increases antenna backlobe and system temperature. Antenna backlobe refers to radiation of energy from the antenna in the opposite direction of the main radiation direction. Increasing backlobe reduces the antenna energy radiating in the main direction. Large aperture mesh is lower cost, lighter weight, and has reduced wind loading. The mesh aperture design would consider such factors. Further, painting the mesh may protect the material from weathering. White paint reflects sunlight from the trough surface thereby minimizing thermal deformations of the structure. The materials and the methods used for constructing the trough reflector can help to lower the cost of the first radar. Note that the first trough reflector 108 can include a group of calibration antennas 146, as shown in FIG. 12. How these antennas 146 are used is further described below.

As shown in FIG. 9, the first 1D phased array 112 forms (or is arranged) in a first line. The first 1D phased array 112 is positioned, in the first line, within the defined area 100. The first 1D phased array 112 is supported (e.g., raised) by the first frame 106 over the first trough reflector 108 such that the first 1D phased array 112 sends a set of signals (e.g., radio) via the first trough reflector 108 and receives a set of reflections based on the set of signals via the first trough reflector 108. For example, as shown in FIG. 6, there can be a reflective pattern 200 where the first 1D phased array 112 can send the set of signals towards the trough reflector 108, which in turn reflects the set of signals in various directions (e.g., off a vertical). For example, the set of signals and the set of reflections can be sent and received in a V-shape (e.g., 11 o'clock, 2 o'clock). When the set of signals is reflected off a space object (e.g., a low earth object, a satellite, a piece of debris), then the set of reflections is received via the first trough reflector 108 and then reflected towards the first 1D phased array 112.

The first radar pair 120a includes a second radar having a second frame 106, a second trough reflector 108 (also called a parabolic cylinder antenna, a parabolic cylindrical antenna, or a parabolic trough antenna), a second catwalk 110, and a second 1D phased array 110. The second frame 106 is positioned within the defined area 100. The second trough reflector 108 is positioned within the defined area 100, secured (e.g., fastened) to the second frame 106, and has a second shape (e.g., U-shape, C-shape), a second longitudinal valley (e.g., extending in a Z-dimension of FIGS. 1, 4, 5), and a second scale (e.g., a size). For example, the second trough reflector 108 can by formed by a group of panels (e.g., metal, alloys, steel, mesh, grid) positioned immediately adjacent to each other to form an upper surface that is configured to reflect various signals (e.g., radio, light). For example, when at least some the panels are mesh panels having holes therein (e.g., contributes to low cost), then the holes may be sized to be smaller than an operating wavelength of the second 1D phased array 110. For example, small aperture mesh provides high reflectivity and low leakage. Signal leakage through the mesh increases antenna backlobe and system temperature. Antenna backlobe refers to radiation of energy from the antenna in the opposite direction of the main radiation direction. Increasing backlobe reduces the antenna energy radiating in the main direction. Large aperture mesh is lower cost, lighter weight, and has reduced wind loading. The mesh aperture design would consider such factors. Further, painting the mesh may protect the material from weathering. White paint reflects sunlight from the trough surface thereby minimizing thermal deformations of the structure. The materials and the methods used for constructing the trough reflector can help to lower the cost of the first radar. Note that the second trough reflector 108 can include a group of calibration antennas 146, as shown in FIG. 12. How these antennas 146 are used is further described below.

The second shape of the second trough reflector 108 is identical to the first shape of the first trough reflector 108. The second longitudinal valley of the second trough reflector 108 is parallel to the first longitudinal valley of the first trough reflector 108. However, the second scale of the second trough reflector 108 is lesser than the first scale of the first trough reflector 108 (although can be equal or greater). For example, the first trough reflector 108 and the second trough reflector 108 are identically shaped and oriented (and spaced apart from each other), but the second trough reflector 108 is a smaller version of the first trough reflector 106. Such configuration is technologically advantageous for various reasons. For example, such configuration enables an efficient (a) determination of an initial orbit for a space object, (b) determination of a range data to the space object, (c) determination of a doppler data relative to the space object, (d) an angle data relative to the space object, (e) a performance of a radar interferometry relative to the space object, and others. For example, arrays of 1D parabolic arrays 108 that can be configured to operate together to make measurements of satellites by having one or more transmit-receive arrays 108 and one or more receive-receive arrays 108 measuring polarization or perform interferometry to get 3D positions of targets.

As shown in FIG. 9, the second 1D phased array 110 forms (or is arranged) in a second line that is parallel to the first line. The second 1D phased array 110 is positioned, in the second line, within the defined area 100. The second 1D phased array 112 is supported (e.g., raised) by the second frame 106 over the second trough reflector 108 such that the second 1D phased array 110 does not send any signals via the second trough reflector 108. However, the second 1D phased array 110 receives the set of reflections based on the set of signals via the second trough reflector 108. For example, as shown in FIG. 6, there can be the reflective pattern 200 when the set of signals from the first 1D phased array is reflected off the space object (e.g., a low earth object, a satellite, a piece of debris), then the set of reflections is received via the second trough reflector 108 and then reflected towards the second 1D phased array 112. For example, the set of reflections can be received in a V-shape (e.g., 11 o'clock, 2 o'clock). Such configuration is technologically advantageous because of various reasons. For example, such configuration enables an efficient (a) determination of an initial orbit for a space object, (b) determination of a range data to the space object, (c) determination of a doppler data relative to the space object, (d) an angle data relative to the space object, (e) a performance of a radar interferometry relative to the space object, and others. For example, arrays of 1D parabolic arrays 108 that can be configured to operate together to make measurements of satellites by having one or more transmit-receive arrays 108 and one or more receive-receive arrays 108 measuring polarization or perform interferometry to get 3D positions of targets.

Note that there can be more than one (e.g., 2, 3, 4, 5, 6, 7, 8, 9, 10, tens, hundreds, thousands) of the second radars relative to the first radar (many-to-one correspondence). These second radars can be placed internal or external to the defined area 100, whether the first longitudinal valley of the first trough reflector 108 is or is not parallel to at least two of the longitudinal valleys of the second trough reflectors 108 of the second radars. How far these second radars (e.g., trough reflectors) are positioned from the first radar or each other depends on signal frequency (e.g., about 15 meters from focus). For example, the second radars can be randomly distributed within the defined area 100, although precision may increase with increasing distance between the first radar and at least two of the second radars or between at least two of the second radars.

Each of the first radar and the second radar includes a respective catwalk 110 having a first leg 110L, a second leg 110L, and a platform 110P. The first leg 110L is secured (e.g., assembled, fastened, monolithic) to a respective frame 106 within the defined area 100. The first leg 110L extends over a respective trough reflector 108. The second leg 110L is secured (e.g., assembled, fastened, monolithic) to a respective frame 106 within the defined area 100. The second leg 110L extends over a respective trough reflector 108. The platform 110P is secured (e.g., assembled, fastened, monolithic) to the first leg 110L and the second leg 1110L within the defined area 100. The platform 110P extends over a respective trough reflector 108 along a respective longitudinal valley (over or not over) and hosts a respective 1D phased array 112 (e.g., supports). The platform 110P of the first radar can extend parallel to the platform 110P of the second radar. Note that in order to physically access each respective catwalk 110, there is a respective ladder spanning between the pad 104 and the platform 110P.

Figure 3:
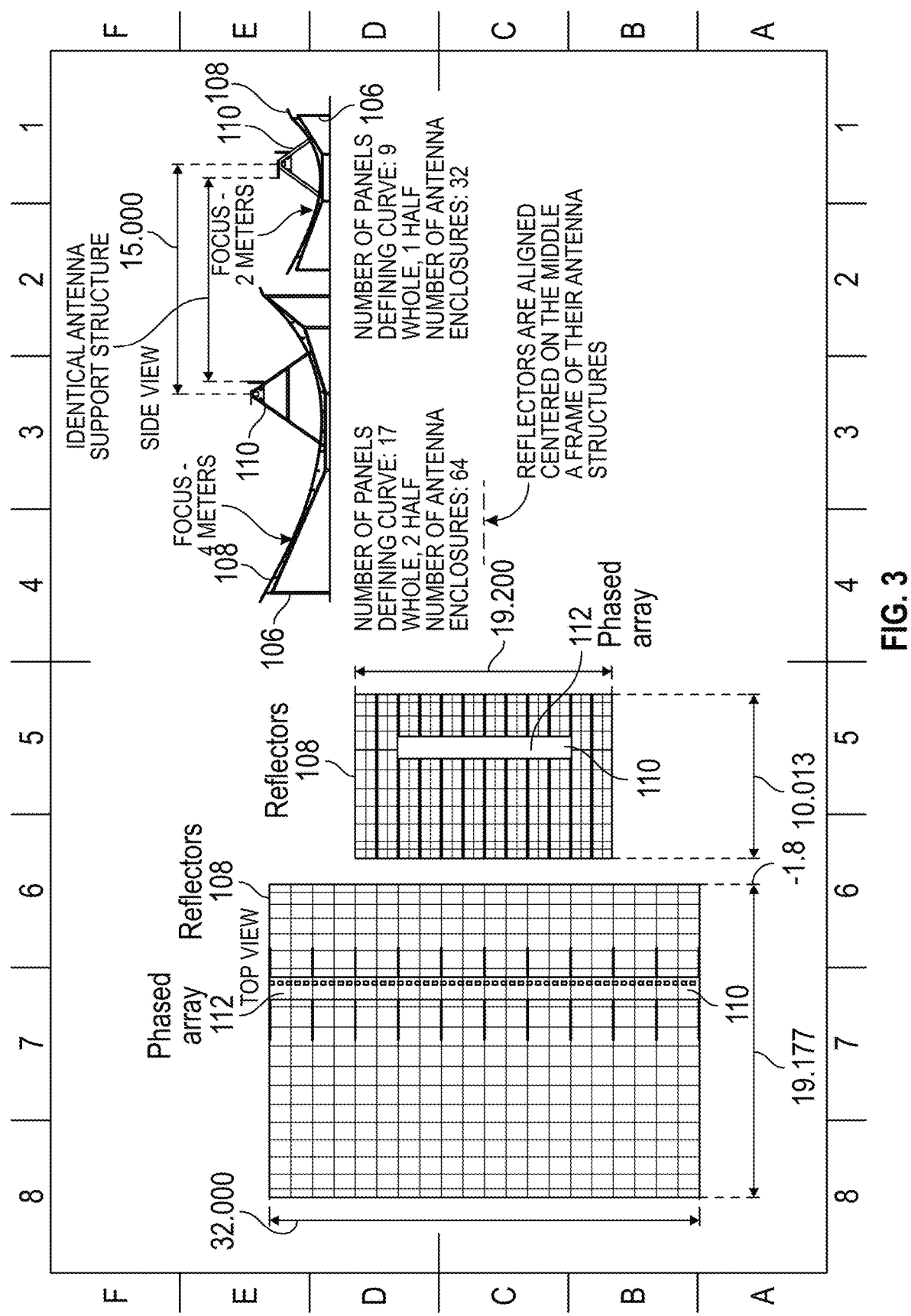
Figure 4:
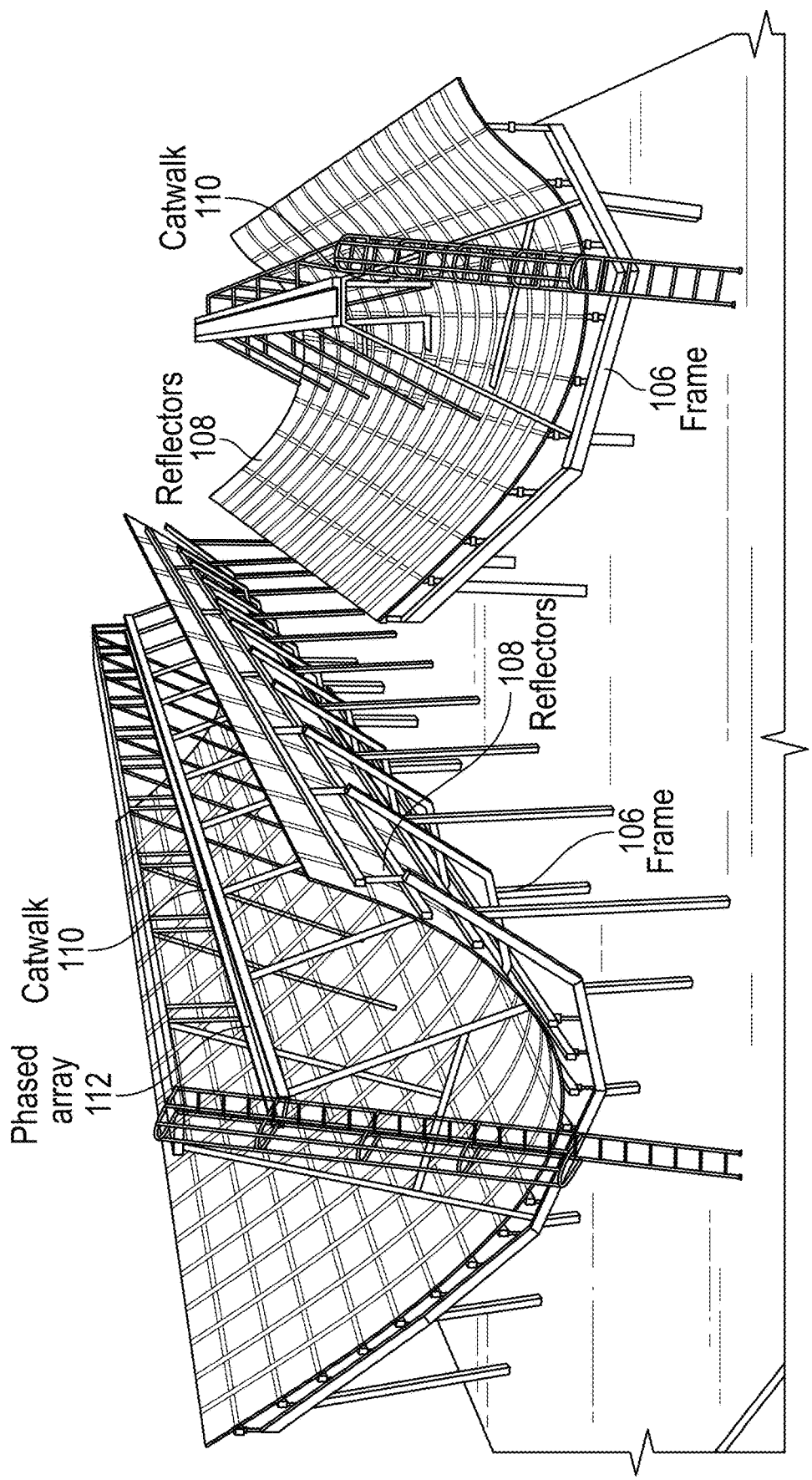

As shown in FIGS. 1, 3, 4, 5, 9, the catwalk 110 can be upright A-shaped such that the platform 110P extends over a respective trough reflector 108. However, as shown in FIG. 12, the catwalk 110 can be slanted V-shaped or slanted A-shaped. Regardless of how the catwalk 110 is shaped, the catwalk 110 supporting the first 1D phased array 112 can be structurally identical to the catwalk 110 supporting the second 1D phased array 112, but at a larger scale (first scaled up from second). Correspondingly, the first radar has a focus proportionally larger than the second radar. For example, as shown in FIG. 3, the focus of the first radar is 4 meters, whereas the focus of the second radar is 2 meters (scaled down 50%). Likewise, as shown in FIG. 3, the first trough reflector 108 and the second trough reflector 108 are aligned centered.

As shown in FIG. 8, the first 1D phased array 112 or the second 1D phased array 112 can include a set of housings 300. In such configuration, these housings 300 can be positioned on a respective platform 110P immediately adjacent to each other (e.g., side-by-side) over a respective trough reflector 108 (as shown in FIGS. 1, 5, 9). Each housing 300 can include a set of antenna elements 302 (e.g., patch antennas) arranged in a line on that respective housing 300 and facing a respective trough reflector 108. For example, each housing 300 or each antenna element 302 can be electronically steerable to simultaneously beam in different directions, whether independent on each other or dependent on each other.

As shown in FIGS. 2, 10, 11, the defined area 100 includes a container 118 having an internal area sized for a user (e.g., a technician) to walk into, navigate therein, and exit out of. For example, the container can include a shipping container, an intermodal container, a building, a tent, a cabin, a booth, a truck, a van, a bus, or other stationary or mobile structures (e.g., land, aerial, marine). For example, the container 118 can be towable or placeable on a bed of a truck or liftable by a crane or assembled onsite. The container 118 can be weatherproof (e.g., in rain, snow, wind, or desert environments) and have various climate control machinery (e.g., air conditioning, vents, humidifiers, dehumidifiers). The container 118 can receive electrical power from power lines, renewable energy sources, electrical generators, or be battery powered, any of which can be local to or remote from the container 118, whether internal or external to the defined area 100. The container 118 can include plastic, metal, fabric, rubber, wood, alloys, or other suitable materials that avoid signally interfering with the radar pairs 120$a$ and 120$b$. The container 118 rests on the pad 104 but can be positioned off the pad 104. The container 118 is spaced apart (e.g., avoiding physical contact) from the first frame 106, the first trough reflector 108, the first 1D phased array 112, the second frame 106, the second trough reflector 108, and the second 1D phased array 112.

As shown in FIGS. 10-11, in order to operate the first radar and the second radar, the container 118 contains operates as an operations and control center and contains a logic (e.g., circuitry, processors, memory, transmitters, receivers, signal splitters) positioned within the internal area. The logic is in communication with the first 1D phased array and the second 1D phased array such that the logic controls the first 1D phase array and the second 1D phased array. The logic includes a processor 134 (e.g., servers, GPUs, accelerator cards) positioned within the container 118, a transmitter 138 positioned within the container 118, a set of radio frequency (RF) receivers 136 positioned within the container 118, and a networking interface 140 (e.g., RF-fiber interface) positioned within the container 118. The transmitter 138 and the set of RF receivers 138 are communicably positioned (e.g., interposed) between the processor 134 and the networking interface 140, within the container 118.

As shown in FIG. 11, since the first 1D phased array 112 sends the set of signals to the first trough reflector 108, the processor 134 controls how these signals get generated and sent. Therefore, external (or internal) to the container 118, there is a signal splitter 142 that receives data from the networking interface 140, as originally sent by the processor 134, and splits this data for distribution among the housings 300 for transmission by the antennas 302. Therefore, the signal splitter 142 is coupled (e.g., electrically, communicably) to the logic (e.g., the processor 134, the transmitter 138, the networking interface 140) and the first 1D phased array 112 (e.g., the housings 300) such that the set of signals is generated based on the signal splitter receiving a set of data from the logic and splitting the set of data for distribution to the housings 300 of the first 1D phased array. However, since each of the first 1D phased array 112 and the second 1D phased array 112 receive the reflections from the space object based on the set of signals, there is a group of signal combiners 144 external (or internal) to the container 118. The group of signal combiners 144 combines the set of reflections from the space object and sends those to the processor 134 through the networking interface 140 and the RF receivers 136. Note that the processor 134 sends data to the transmitter 138 and receives data from each of the RF receivers 136. Likewise, note that the transmitter 138 send data to the networking interface 140. Similarly, note that each of the RF receivers 136 receives data from the networking interface 140. Moreover, note that the networking interface 140 sends data to the signal splitter 142 and receive data from the combiners 144. Additionally, note that the splitter 142 sends data to the housings 300 and the combiners 144 receive data from the housings 300.

The first 1D phased array 112 sends the set of signals via the first trough reflector 108 based on a first circular polarization and receives the set of reflections via the first trough reflector 108 based on a second circular polarization. The first circular polarization is not identical to the second circular polarization (e.g., offset in quadrants). The first circular polarization can be opposite the second circular polarization. However, the second 1D phased array 112 receives the set of reflections via the second trough reflector 108 based on the first circular polarization and the second circular polarization.

As shown in FIG. 8, each of the housings 300 is weatherproof (e.g., in rain, snow, wind, or desert environments) and avoids signal interference with the first radar and the second radar, as disclosed herein. Further, each of the housings 300 has a group of cables/cords 310 extending outwardly therefrom (e.g., top side, lateral side). The cables/cords 310 communicably couple to the logic of the container 118 (e.g., the processor 134) and provide electrical power, both in order to enable various send/receive signal operations, as disclosed herein. Additionally, each of the housings 300 has a first plate 304 and a second plate 306 arranged with each other to form an L-shape or a T-shape. The first plate 304 hosts the antennas 302 (e.g., patch antennas) linearly arranged thereon. The first plate 304 faces a respective trough reflector 108 when sending/transmitting, as disclosed herein. The second plate 306 extends into a respective housing 300 and hosts various circuitry driving/powering the antennas 302. Therefore, when the antennas 302 are transmitting towards a respective trough reflector 108, the plate 306 is not externally visible due to its extension into a respective housing 300. Also, each of the housings 300 includes an antenna 308 extending outwardly therefrom (elemental antenna). The antenna 308 is not positioned on the plate 304, but spaced apart therefrom (e.g., within about 2 inches). The antenna 308 is configured to calibrate each of the first radar or the second radar, as disclosed herein.

As shown in FIGS. 1, 2, 5, 7, 10, 13, the defined area 100 includes the first pair 120a and the second radar pair 120b. The second radar pair 120b is similar or identical (e.g., in shape, materials, operation) to the radar pair 120a. For example, the second radar pair 120b has a third radar and a fourth radar. The third radar has a third frame 106, a third trough reflector 108 (also called a parabolic cylinder antenna, a parabolic cylindrical antenna, or a parabolic trough antenna), and a third 1D phased array 112. The third frame 106 is positioned within the defined area 100. The third trough reflector 108 is positioned within the defined area 100, is secured to the third frame 106, and has a third shape, a third longitudinal valley, and a third scale. Similar to the first radar pair 120a, the third 1D phased array 112 is positioned within the defined area 100 and supported by the third frame 106 over the third trough reflector 108 such that the third 1D phased array 112 sends a set of signals via the third trough reflector 108 and receives a set of reflections off the space object based on the set of signals via the third trough reflector 108. Likewise, the fourth radar includes a fourth frame 106, a fourth trough reflector 108 (also called a parabolic cylinder antenna, a parabolic cylindrical antenna, or a parabolic trough antenna), and a fourth 1D phased array 112. The fourth frame 106 is positioned within the defined area 100. The fourth trough reflector 108 is positioned within the defined area 100, secured to the fourth frame 106, and has a fourth shape, a fourth longitudinal valley, and a fourth scale. Similar to the first radar pair 120a, the fourth shape is the third shape, the fourth longitudinal valley extends parallel to the third longitudinal valley, and the fourth scale is lesser than the third scale. The fourth 1D phased array 112 is positioned within the defined area 100. Similar to the first radar pair 120a, the fourth 1D phased array 112 is supported by the fourth frame 106 over the fourth trough reflector 108 such that the fourth 1D phased array 112 does not send any signals via the fourth trough reflector 108 and receives the set of reflections off the space object based on the set of signals via the fourth trough reflector 108.

However, as shown in FIGS. 1, 2, 5, 10, 13, note that the first radar pair 120a and the second radar pair 120b are oriented towards different (e.g., opposite) sides of a sky (e.g., different field of views). This configuration can be accomplished in various ways. For example, this configuration can be accomplished when the second trough reflector 108 of the first radar pair 120a is positioned between the first trough reflector 108 of the first radar pair 120a and the fourth trough reflector 108 of the second radar pair 120b. Likewise, this configuration can be accomplished when the fourth trough reflector 108 of the second radar pair 120b is positioned between the second trough reflector 108 of the first radar pair 120a and the third trough reflector 108 of the second radar pair 120b. Similarly, this configuration can be accomplished when the second radar of the first radar pair 120a and the fourth radar of the second radar pair 120b are positioned between the first radar of the first radar pair 120a and the third radar of the second radar pair 120a. Moreover, this configuration can be accomplished when Rx/Rx radars are positioned between Tx/Rx radars. Resultantly, the set of reflections off the space object received by the first 1D phased array and the second 1D phased array forms a first field of view and the set of reflections received by the third 1D phased array and the fourth 1D phased array forms a second field of view, where the first field of view does not overlap with the second field of view (coverage of different sky areas). This configuration is technologically advantageous for various reasons. For example, if the processor 134 is in communication with the first 1D phased array 112, the second 1D phased array 112, the third 1D phased array 112, and the fourth 1D phased array 112, then the processor 134 can be programmed to track the space object traveling on an orbit within the first field of view (the first radar pair 120a) and the second field of view (the second radar pair 120b) such that the space object traveling on the orbit can be detected from within the defined area 100 at least twice in a single pass over the defined area 100. For example, there can be a 1D phased array-operations and control center (OCC) interface. In particular, a radar site 100 contains pairs of 1-D phased array 112 radars which illuminate parabolic-trough reflectors 108. The trough reflectors 108 are composed of octopods 300, which can each have 8 transmit-receive antenna elements. A TxRx trough 108 (large) is one that transmits and receives, and an RxRx trough 108 (small) is one that receives only. A TxRx trough 108 transmits and receives on a single (but opposite) but polarization, whereas an RxRx trough 108 receives both polarizations. The troughs 108 are controlled from OCC 118. The OCC 118 generates a transmit signal on a server that is generated using a digital transceiver. The transmit signal is sent over fiber (e.g., RF over fiber) to a 64-way (or less or more) splitter which feeds all octopods 300. On receive, the octopods 30 are grouped into batches 8 (or less or more) and combined using passive optical techniques. The received signal is converted to RF in the OCC, sent to a server array 134, and processed. Similarly, for an RxRx trough 108, the receiver signal is routed to the OCC 118.

With respect to the first radar pair 120*a* and the second pair 120*b*, the second longitudinal valley can extend parallel to the fourth longitudinal valley or the first longitudinal valley can extend parallel to the third longitudinal valley. However, note that this can configuration vary where the second longitudinal valley does not extend parallel to the fourth longitudinal valley or the first longitudinal valley does not extend parallel to the third longitudinal valley.

As shown in FIGS. 11-31, another technological advantage of the defined area 100 having the first radar pair 120*a* and the second radar pair 120*b* manifests itself in determining an initial orbit for the space object. In particular, the processor 130 can be in communication with the first 1D phased array 112, the second 1D phased array 112, the third 1D phased array 112, and the fourth 1D phased array 112. Therefore, as shown in FIGS. 15-20, the processor 134 can be programmed to cause the first 1D phased array 112 and the second 1D phased array 112 to detect the space object within the first field of view based on the set of reflections off the space object, as received by the first trough reflector 108 and the second trough reflector 108. As shown in FIG. 13, this occurs based on a trajectory of the space object (e.g., a satellite) intersecting the first field of view (1D) of the first radar pair 120*a*. Then, as shown in FIGS. 15-20, the processor 134 can determine an initial orbit (e.g., trajectory data) for the space object based on this set of reflections. For example, this can occur based on getting a first tracklet from the first trough reflector 108 and a second tracklet from the second trough reflector 108, selecting a best candidate from each of the first tracklet and the second tracklet (e.g., dynamical measurement fitter), and then guessing the initial orbit based on the best tracklets.

The initial orbit can be determined for various reasons. For example, the initial orbit can be determined when the space object is not listed in a record of a set of records (e.g., a new space object) in a database (e.g., relational, in-memory, No-SQL, graphical, cloud) remote from the processor (e.g., Amazon cloud computing instance), where the set of records corresponds to a set of space objects other than the space object. For example, the initial orbit can be determined when the space object that is recorded in a record of a database (e.g., relational, in-memory, No-SQL, graphical, cloud) remote from the processor (e.g., Amazon cloud computing instance) lacks an orbit parameter (e.g., velocity, height, current position, expected position) corresponding to the space object for a predetermined time period (e.g., data for the space object is stale, need to reinitialize orbits for known space objects with no or minimal measurements for a predetermined time period).

Regardless of why the initial orbit is determined, the processor 134 can create a schedule for the third 1D phase array 112 and the fourth 1D phased array 112 to detect the space object after the initial orbit for the space object is determined. For example, the schedule can include date, time, and positional expectancy for the space object for the second radar pair 120*b*. Then, the processor 134 can cause the third 1D phased array 112 and the fourth 1D phased array 112 to detect the space object within the second field of view based on the set of reflections off the space object as received by the third trough reflector 108 and the fourth trough reflector 108 according to the schedule. This occurs based on a trajectory of the space object (e.g., a satellite) intersecting the second field of view (1D) of the second radar pair 120*b*. Then, the processor 134 can take an action associated with the initial orbit responsive to the space object being detected within the second field of view based on the second set of reflections according to the schedule. Some of such actions can include modifying the initial orbit such that a new orbit (e.g., trajectory data) is formed, keeping the initial orbit as is, creating a new orbit (e.g., trajectory data) based on the initial orbit, or others. Note that since the space object traveling on the orbit can be detected from within the defined area 100 at least twice in the single pass over the defined area 100, the processor 134 should be located within the defined area 100 in order to minimize latency and expedite real-time processing since there may be a short time period (e.g., seconds, tens of seconds) between the space object being detected by the first radar pair 120*a* and when the space object is scheduled to detected by the second radar pair 120*b*.

For example, there can be an initial orbit determination based on multiple troughs 108. In particular, a user (e.g., a technician, a satellite operator, an insurance company) may want to be able to detect uncatalogued (e.g., not included in a database for catalogued space objects) various space objects (e.g., satellites) at a single radar site 110, and form the initial orbit determination so that the user can maintain knowledge custody of those space objects and add data for those space objects to the catalog (e.g., database). As such, a target (e.g., a satellite) can be detected in a first trough 108 or a first pair of troughs 108, as disclosed herein, where at least some measurements an include a series of range, doppler, and angle measurements. Then, the initial orbit is formed using these measurements (this should be done relatively quickly or in real-time). Then, a prediction of when and where the target will cross a second trough 108 or a second pair of troughs 108 is made. Then, the second trough 108 or the second pair of troughs 108 is scheduled to detect the target. Since the pass through the second trough 108 or the second pair of troughs 108 can be tens of seconds after the detection in the first trough 108 or the first pair of troughs 108, this should be done relatively quickly or in real time. Then, based on the schedule, a detection is made in the second trough 108 or the second pair of troughs 108. Then, the data is combined to form an initial orbit determination and can then be used for follow up at other radar sites, whether similar or dissimilar to the radar site 100.

In terms of a software architecture to enable determining of the initial orbit, as shown in FIGS. 22-31, there can be group of scripts (e.g., Python, JavaScript), where one of these scripts performs various environmental functions (e.g., file path, basic setting, input/out libraries declarations, function calls) and another one of these scripts performs various operations on backend (e.g., time format conversion, orbit expression conversion, cost function minimization, residual calculation).

Figure 23:
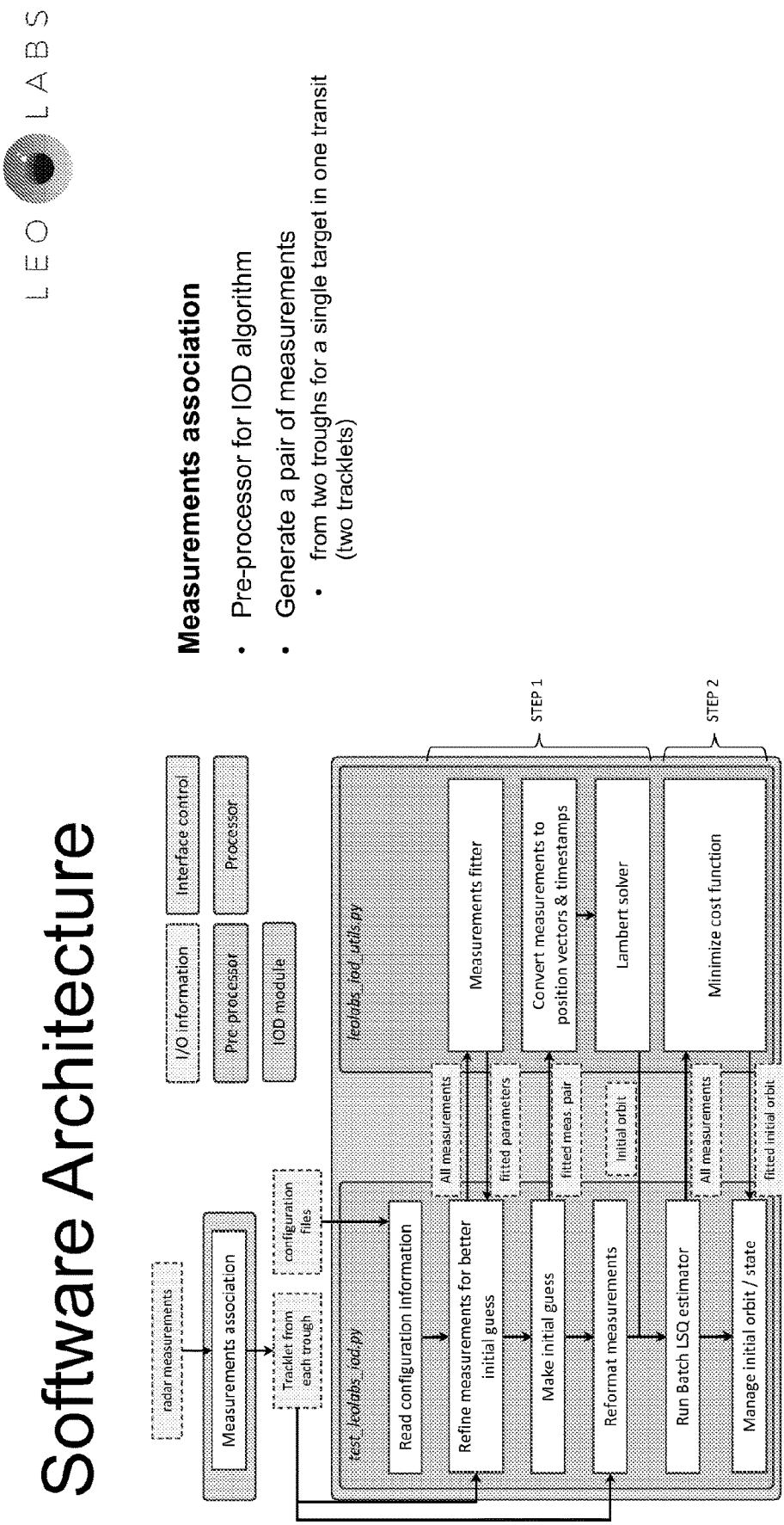
Figure 24:
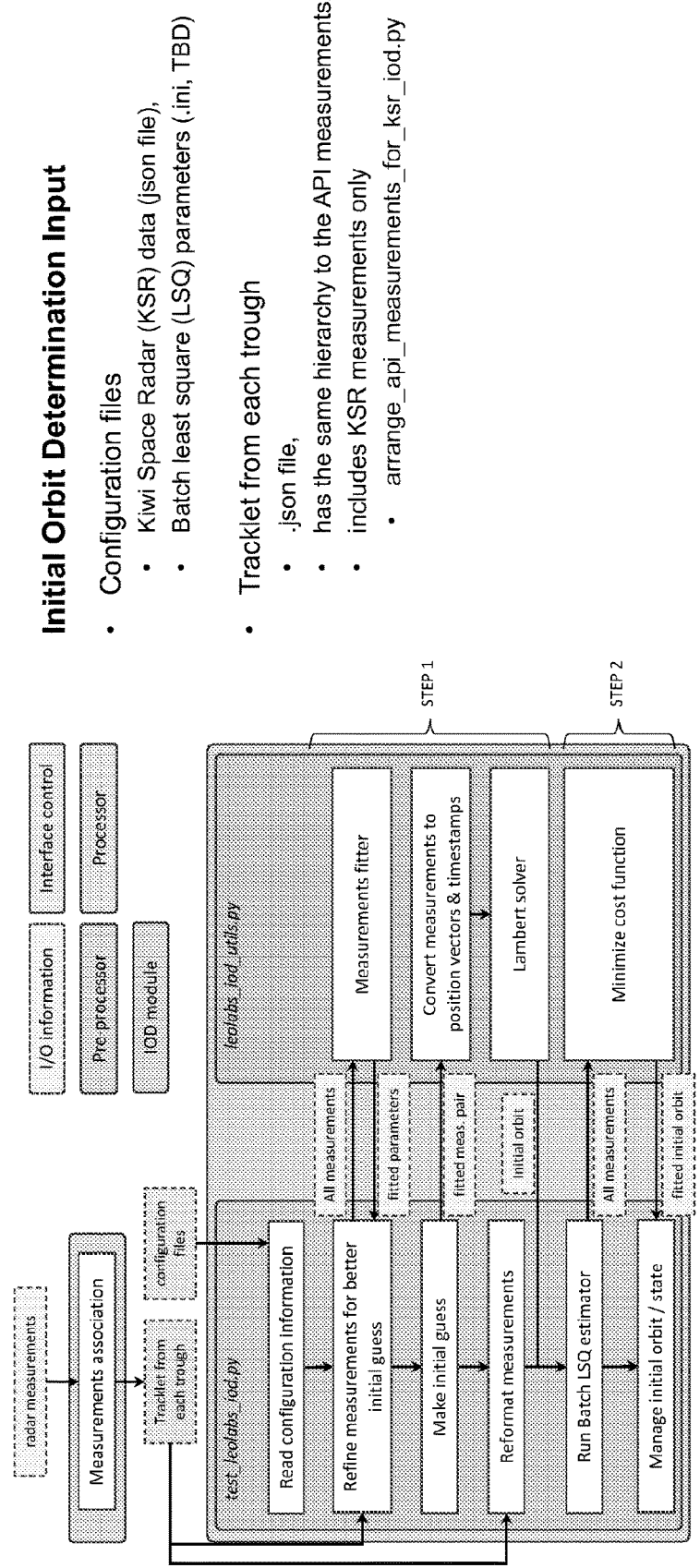
Figure 25:
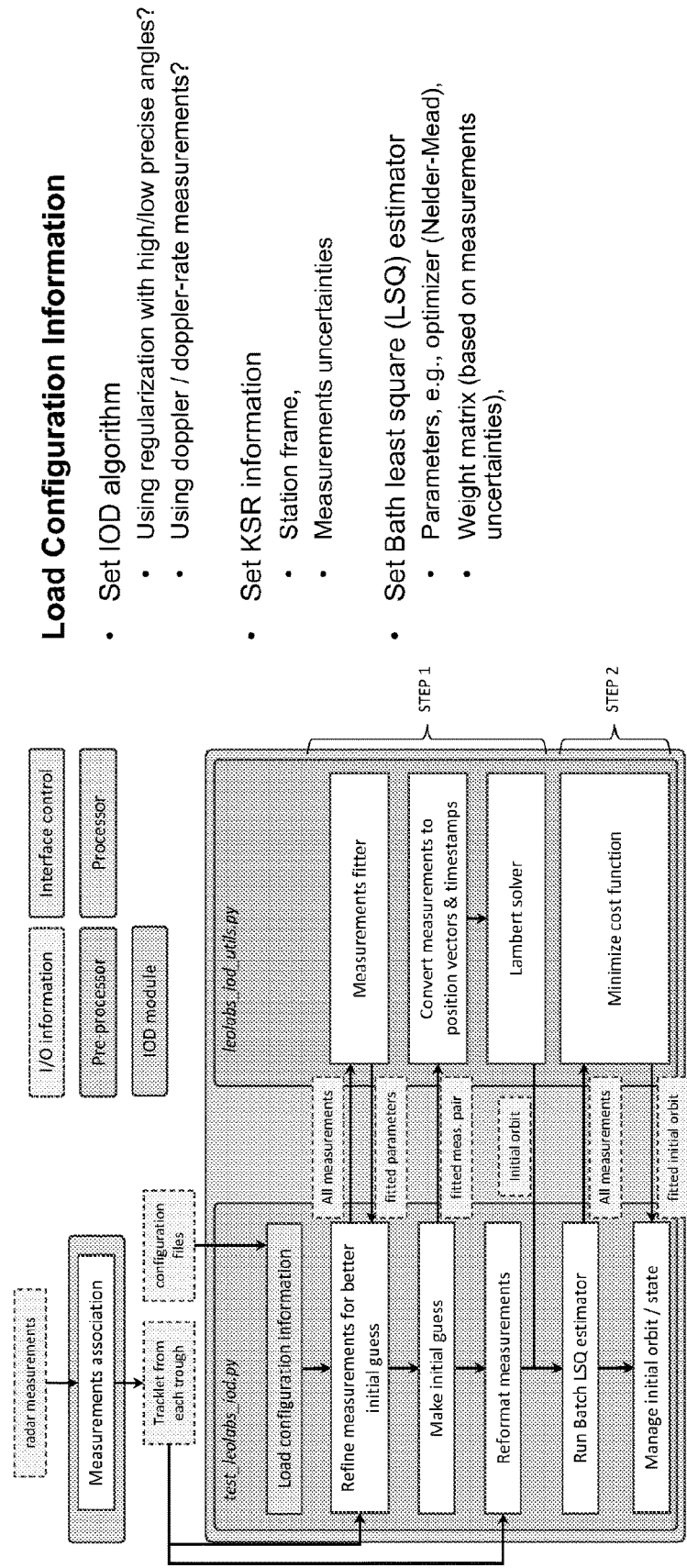
Figure 26:
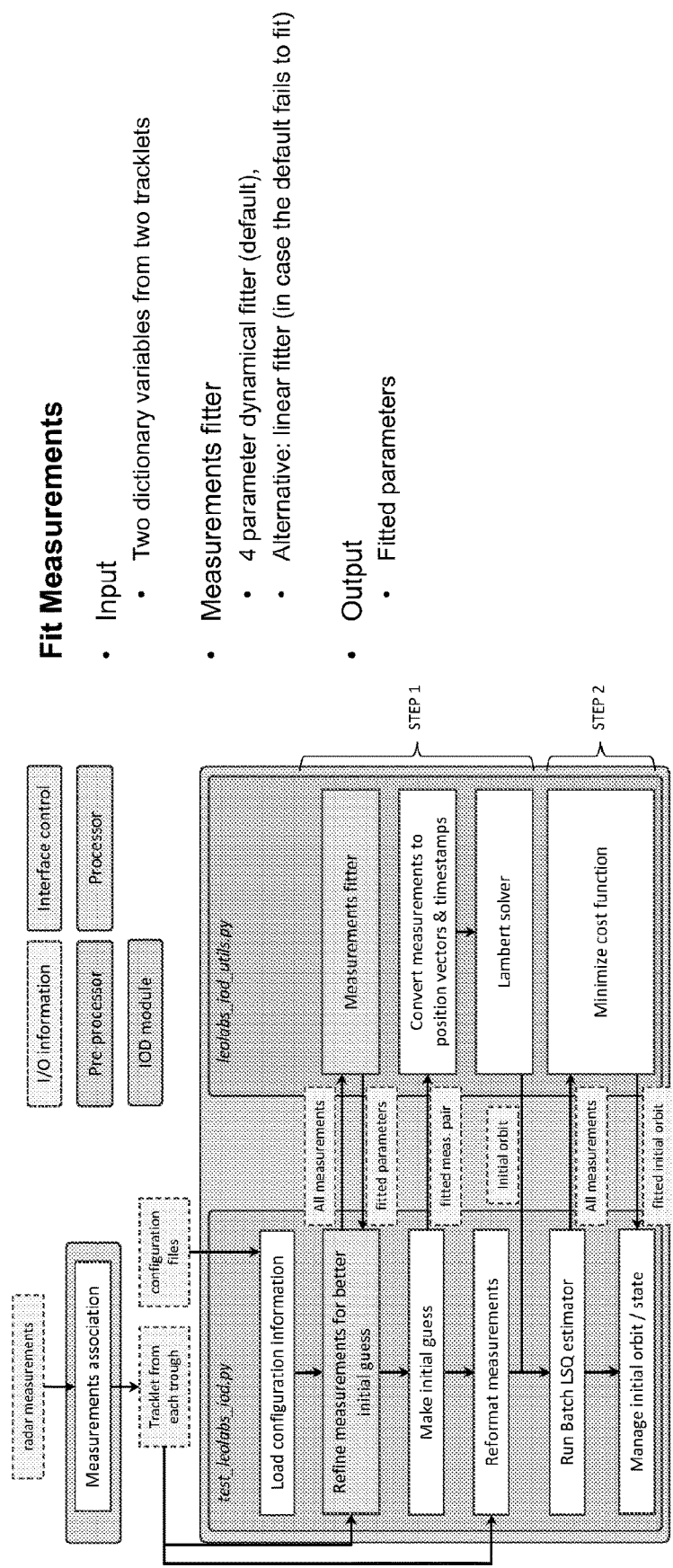
Figure 27:
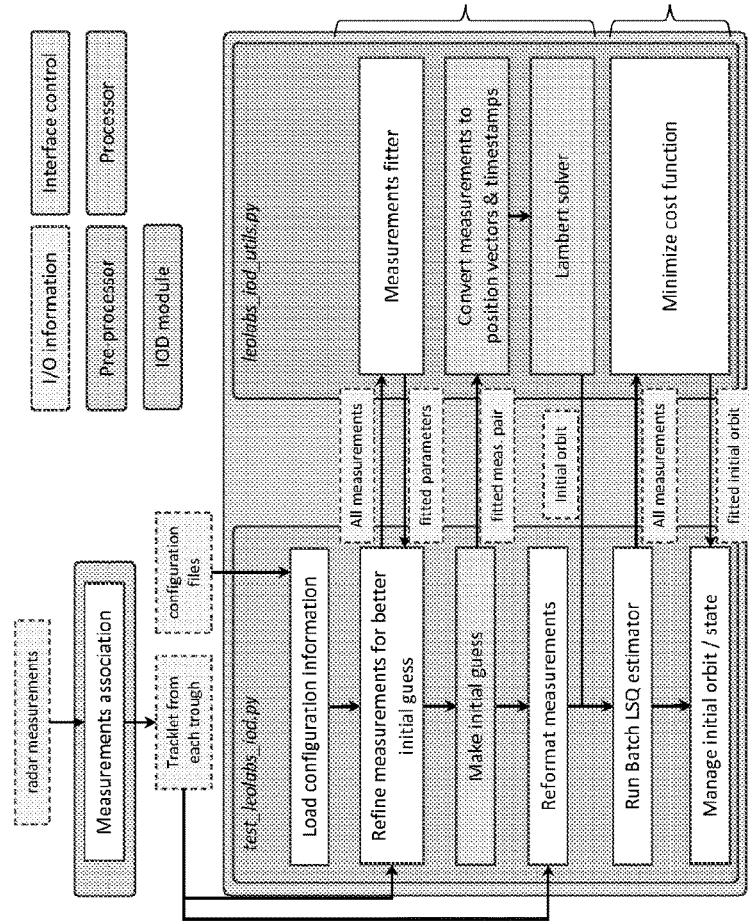
Figure 28:
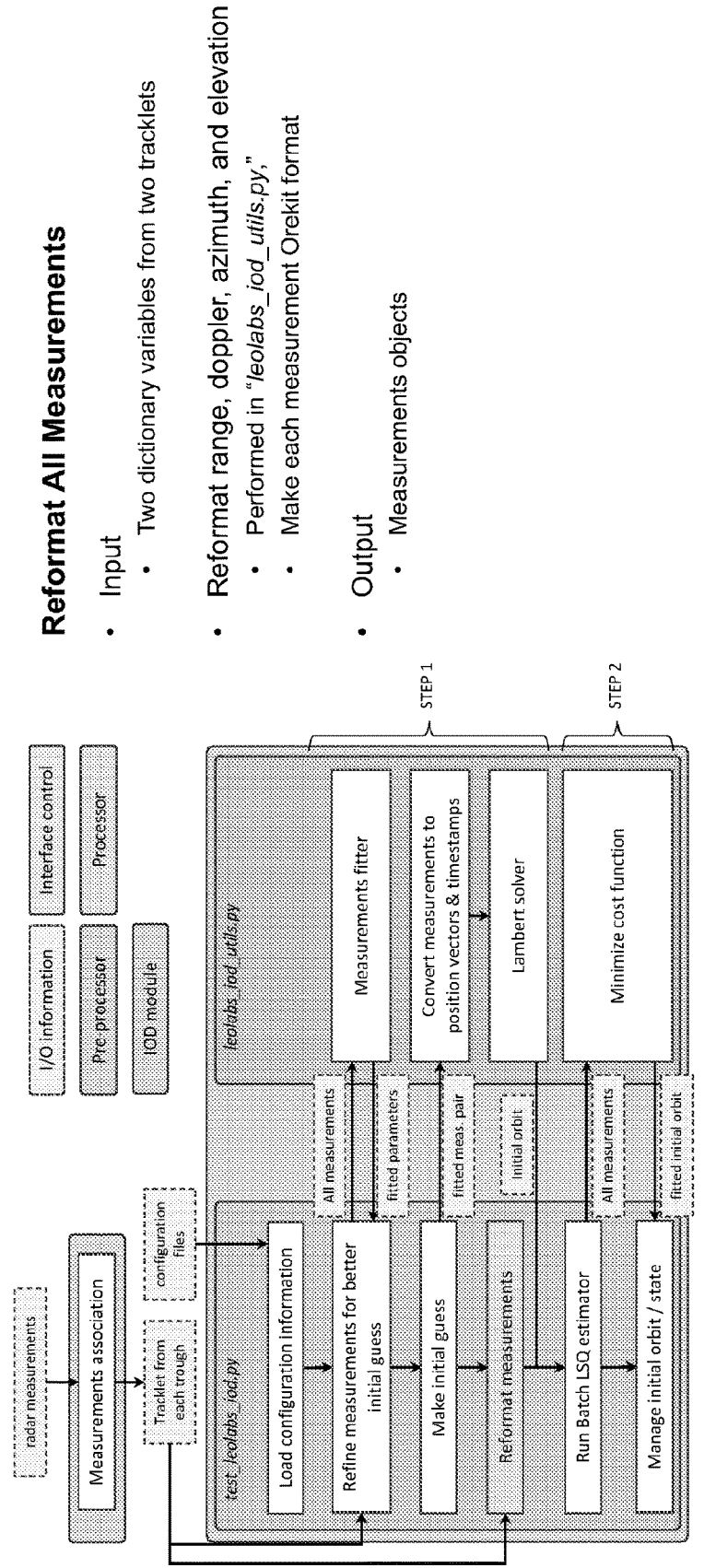
Figure 29:
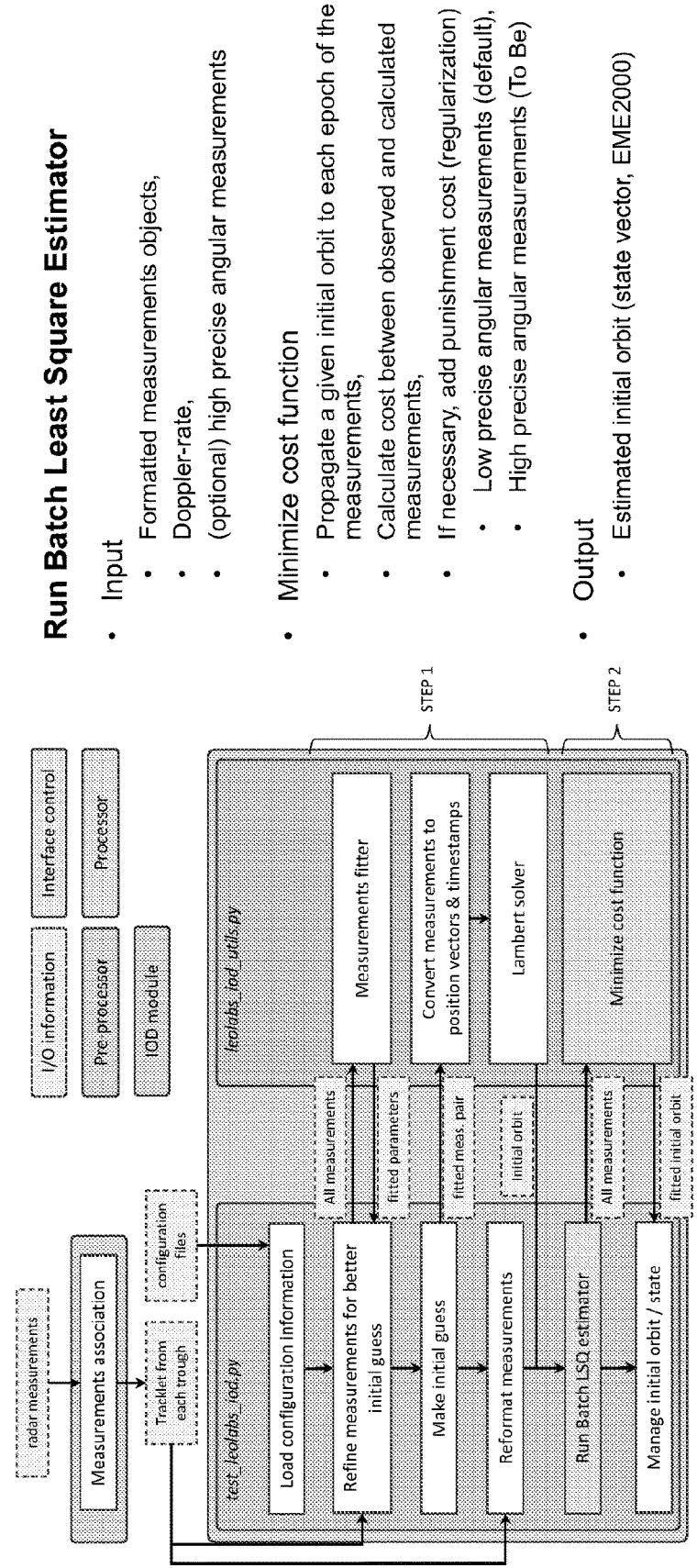
Figure 30:
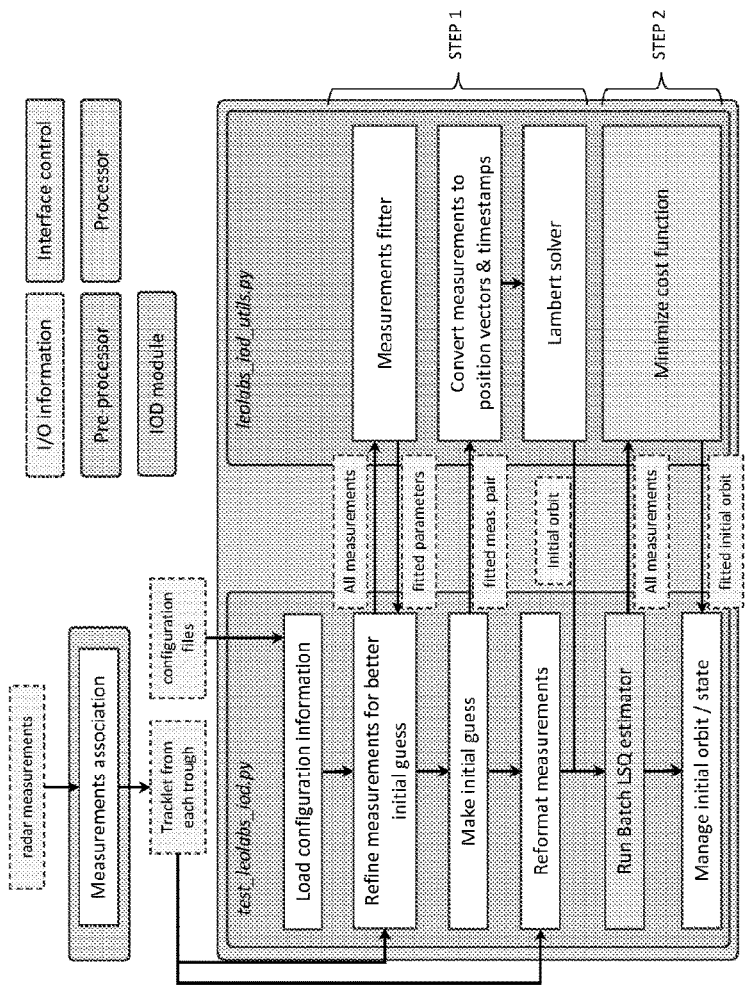
Figure 31:
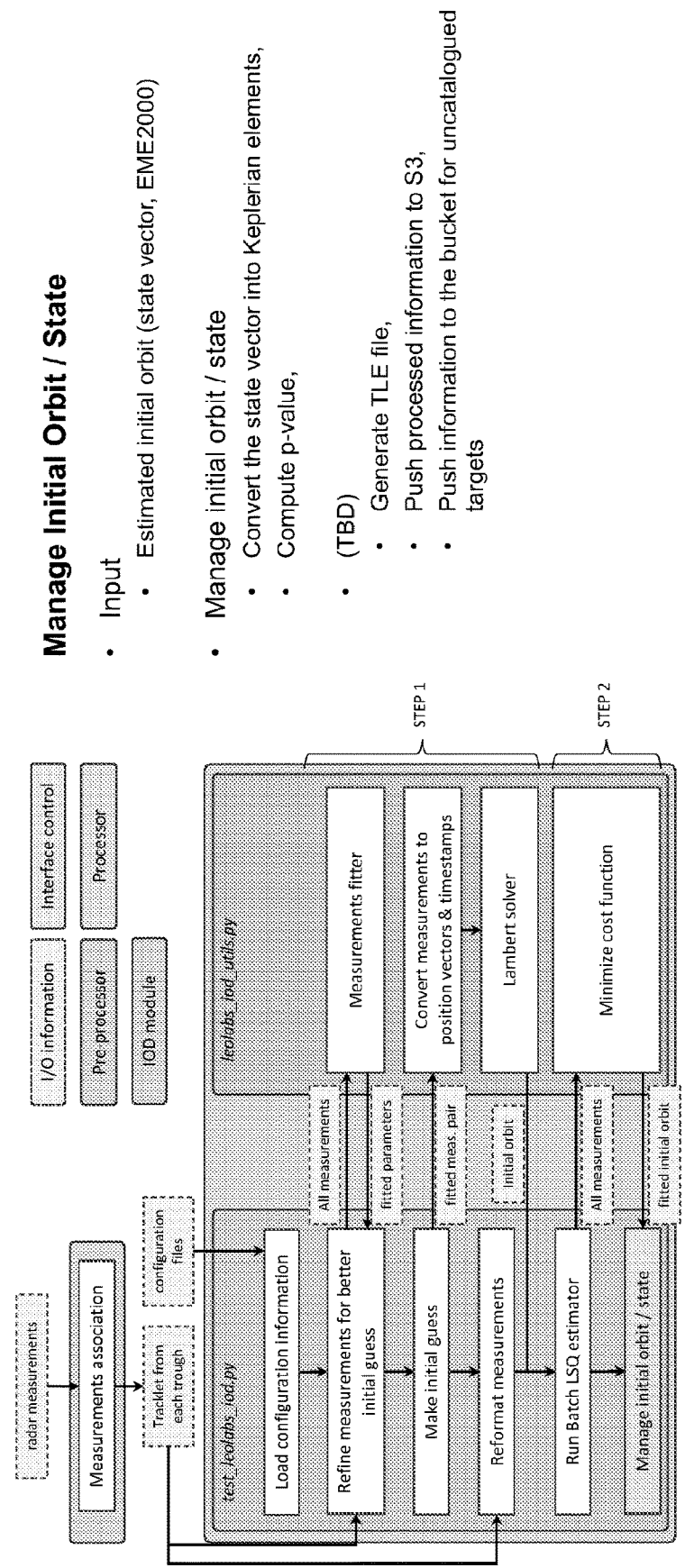

As shown in FIG. 23, the group of scripts is contained within a module that receives data from configuration files and data from the tracklets of each of the first radar pair 120*a* and the second radar pair 120*b*. The data from the tracklets is sourced from a pre-processor as fed by each of the first radar pair 120*a* and the second radar pair 120*b*. Within the module, the scripts bidirectionally communicate with each other. For example, some measurements and fitted measurement pairs can be sent from one of the scripts (environmental functions). Likewise, some fitted parameters, data from a Lambert solver, and data for fitted initial orbits can be sent from one of the scripts (backend). How these operations occur is shown in FIGS. 24-31.

As shown in FIGS. 32-33, another technological benefit of having the radar pair 120*a* or the radar pair 120*b* manifests itself in performing radar interferometry. In particular, the processor 134 can be in communication with the first 1D phased array 112 (or the third 1D phased array 112) and the second 1D phased array 112 (or the fourth 1D phased array 112). Then, the processor can be programmed to perform a radar interferometry for the space object detected based on the first 1D phased array 112 sending the set of signals via the first trough reflector 108 (or the third trough reflector 108) towards the space object and receiving the set of reflections off the space object by the first 1D phased array 112 (or the third 1D phased array 112) via the first trough reflector 108 (or the third trough reflector 108) and by the second 1D phased array 112 (or the fourth 1D phased array 112) via the second trough reflector 108 (or the fourth trough reflector 108). The radar interferometry can include converting a set of time series formed from a set of independent data channels into a best-fit range, a radial velocity, a radial acceleration, and an x/y offset position.

Using the first radar pair 120*a* or the second radar pair 120*b*, as disclosed herein, enables at least some capture of various interferometric metrics to determine in high precision a location of a target (e.g., a space object, a satellite) within a beam from a respective 1D phased array reflected by a respective trough reflector 108. FIG. 32 shows a sample configuration of receive channels. Here, there is a sub-digitization of a TxRx trough reflector 108 (large) into 4 groups (black dots). Note that a RxRx trough reflector 108 (small) has a single channel (blue dot). The RxRx trough reflector 108 is separated in a direction perpendicular from the TxRx trough reflector 108 and such positioning provides a unique interferometric baseline, which provides sensitivity to the position of the target in the y direction. The sub-sampling of the aperture of the TxRx trough reflector 108 provides sensitivity to the position of the target in the x direction.

The separation of the trough reflectors 108 is chosen to create unambiguous images of the target locations. If the trough reflectors 108 were too far apart, then the resolution would increase, but the grating lobes would provide ambiguity in the target location. Adding more RxRx trough reflectors 108 would allow one to achieve both higher precision and unambiguous positional information.

As shown in FIG. 33, the data from the sub channels are combined to form interferometric estimates of the target position within the beam. Broadly, the main goal is to convert a single set of time series from several independent data channels into a best-fit range, radial velocity, radial acceleration, and x/y offset position (relative to the nominal beam center). Also produced are the per-channel phase residuals and the per-channel best-fit signal level. The per-channel values are valuable for evaluating and updating phase calibrations.

As shown in FIGS. 32-33, a key input to the process is an initial detection of a target. The target data will have been identified through the standard (non-interferometric) detection approach. The target data could also be provided by a high-fidelity state vector. The input will include a range and radial velocity estimate so that a broad search on those dimensions is not necessary. Some sources for those values include a previously run coherent or incoherent processing or a high-fidelity state vector. For example, the input range/doppler values should have errors of less than 1 km and 100 m/s, respectively, although this can vary as needed.

As shown in FIG. 33, the processor 134 (e.g., an interferometric processor) can be programmed to mix the time series with the nominal radial velocity and acceleration. Then, the processor 134 can demodulate the ranges-of-interest. Note that it is assumed that the number of ranges-of-interest will be smaller than about 1 km, although this can vary as needed. Then, the processor 134 can filter/downsample the data. Note that due to the small number of ranges- and radial velocities-of-interest, this is the sole downsample stage for this module. Then, the processor can perform interpolation in range. Then, the processor 134 can calculate the complex Fourier spectra of each channel. Then, the processor 134 can fit and interpolate over range/velocity/acceleration and form the best-fit complex visibilities. Then, the processor can resample the visibilities onto a 2D UV grid and transform into a synthesized image. Then, the processor 134 can identify the peak signal in the synthesized image to find the best-fit position of the target. Then the processor 134 can use the target position and assumption of a point source to find the individual channel phase errors via self-calibration.

For example, as disclosed herein, this disclosure discloses a design for a radar to track a space object. The radar can include multiple reflectors 108, each of which can be illuminated by a 1D phased array feed 112, which can nominally operate in an S-band frequency range. The reflectors 108 can come in pairs—one that is able to transmit and receive (the first radar), and the other which is able to receive only (the second radar). This combination allows to measure range, range-rate (e.g., Doppler), and two-dimensional angles of space objects passing through a field-of-view (FOV), the latter can use methods of radar interferometry. For example, an instantiation can include at least two pairs of reflectors 108 on a given site (e.g., within a defined, zoned, or enclosed area 100). One pair 120*a* is pointed or directed at a set angle (e.g., 20 degrees off-vertical) in one direction, and the other pair 120*b* is pointed or directed at a set angle (e.g., 20 degrees off-vertical) in another direction, which can be an opposing direction. This combination allows to measure space objects at multiple points in a single pass over the site, as the space objects cross the FOVs, and use that to construct an initial orbit determination (IOD) of the space objects. Although FIGS. 1-33 show some dimensions, orientations, and parameters, note that these dimensions, orientations, and parameters are illustrative and can vary, whether greater or lesser, as needed.

As shown in FIGS. 1-33, a site-level design 100 for a radar tracking system can include pairs of radar troughs 108. The radar troughs 108 can include arrays of electronic boxes 300 (or housings or containers) called octopods. Each trough 108 enables precisely measurement of range, range-rate (e.g., Doppler), and angles of space objects. Further, the radar tracking system can enable a method of estimating an angle to a target (e.g., space object) can be performed by digitizing groups of octopods 300 within a single trough, and a method of estimating a second angle to a target by using the Rx/Rx trough, and combining those to precisely estimate a position of the target within a radar beam. Also, the radar tracking system enables a calibration measurement system.

As shown in FIGS. 1-33, a site design can includes 2 (or more or less) large reflectors 108 (Tx/Rx reflectors), 2 (or more or less) small reflectors 108 (Rx/Rx reflectors), operations and control center 118 (e.g., within a shipping container or another enclosure), and cabling/power plant/grounding/internet/fencing/etc. The reflectors 108 can come in pairs—one large Tx/Rx reflector 108 and a smaller Rx/Rx reflector 108. The Tx/Rx reflector 108 can transmit one circular polarization, and receives the other. The Rx/Rx reflector 108 can receive both polarizations. The Tx/Rx system can be divided into 4 (or more or less) segments for doing interferometric angle measurements (Up/Down in FIG. 3). The Rx/Rx system can allow for angle measurement in the other dimension (Left/Right in FIG. 3)

As shown in FIGS. 1-33, a reflector 108 can include a steel-beam frame 106 (or another material or another metal or alloy), a plurality of aluminum (or another material or another metal or another alloy) mesh panels that are mounted (e.g. fastening, adhering, mating, interlocking, adhering) on the reflector, a catwalk 110 that gives access to a focus zone, and transmit-receive electronics 300 (Octopods) at the focus zone, which illuminate the mesh panels.

The reflectors 108 can be parabolic troughs, i.e., cylindrical paraboloids, and can be designed to point at a specific angle off vertical (e.g., 20 degrees), but oriented such that a focal array is pointed straight down at a ground, pad, vehicle (e.g., land, marine, aerial), or platform, on which the reflector 108 is hosted. Note that the specific angle is not limited to about 20 degrees, but can be greater or lesser, whether perpendicular or non-perpendicular (e.g., between about 0 and about 90 degrees).

Sometimes, in order for a phased array radar to operate effectively, an electronic and cable phase delay of some, each, many, most, or all paths must be precisely calibrated. This signal calibration can occur in several ways. One way of signal calibration has some, many, most, or all octopods 300 has a calibration antenna 308 thereon. Various switches in the octopod 300 allow one to transmit from that antenna 308 and receive on an element 302, transmit on an element 302 and receive on that antenna 308, and transmit from one octopod 300 to another. In addition, one is able to loop a signal through various portions of an RF chain to measure and calibrate phase. Another way of signal calibration has several antennas 146 embedded into a surface of the reflector 108. One can transmit from that calibration antenna 146 and receive at an octopod element 300, or transmit from the octopod 300 and receive at the calibration antenna 146 to measure phase and amplitude. This configuration/technique combined with a theoretical model of phase delays can be used to calibrate the phased array. Yet another way of signal calibration has the calibration antenna in a far-field of up to 8 elements of the array, although more or less are possible. Thus, the calibration antenna can be used to measure a beam pattern of an octopod 300 or overlapping elements of the octopods 300. An adaptive beamforming approach can be implemented that tunes the beam pattern to best fit a theoretical model of the gain pattern. This approach can utilize only the signal strength, and not the phase, of the resulting pattern.

There can be many (more than two) pairs of reflectors 108 at a given site, such as 2, 3, 4, 5, 6, 7, 8, 9, 10, tens, hundreds, thousands, or more inclusive of intermediate whole values therebetween. Further, there can be multiple Rx/Rx troughs 108 for a given Tx/Rx trough (e.g., many-to-one correspondence). For example, there can be at least 1, 2, 3, 4, 5, 6, 7, 8, 9, 10, tens, hundreds, thousands, or more inclusive of intermediate whole values therebetween. These Rx/Rx 108 can be positioned adjacent to or around the given Tx/Rx 108, whether feet, yards, or miles apart, depending on angle desired. These Rx/Rx 108 can also be successively or consecutively positioned in a line (e.g. train manner) or in a closed shape (e.g., 0, D, P) or open shape (e.g., U, C, J, S, L) about the Tx/Rx.

As shown in FIGS. 1-33, there can be a system comprising: a frame 106; a reflector 108 supported via the frame 106; a catwalk 110 extending over the reflector 108; and a phased array 112 supported via the catwalk 110 and directed at the reflector 108 such that a space object can be tracked. The frame 106 can be supported via a volume of soil 102 or ground. The frame 106 can be supported via a vehicle (e.g., land, marine, aerial). The frame 106 can be supported via a sea platform, inclusive of any body of water platform. The phased array 112 is a 1D phased array. The phased array 112 can operate in an S-band frequency range. The phased array 112 can be oriented at a ground surface. The phased array 112 can transmit a plurality of first signals via the reflector 108 and can receive a plurality of second signals (e.g., reflections) via the reflector 108. The phased array 112 can avoid transmit any signals via the reflector 108 and yet receive a plurality of signals (e.g., reflections) via the reflector 108. The reflector 108 can be a parabolic trough. The reflector 108 can be a cylindrical paraboloid. The phased array 112 and the reflector 108 can be positioned such that the phased array 112 directs a plurality of signals to the reflector 108 and the reflector 108 reflects the signals at a non-perpendicular angle. The non-perpendicular angle can be between about 0 degrees and 90 degrees, and within that range less than about 80 degrees, less than about 70 degrees, less than about 60 degrees, less than about 50 degrees, less than about 40 degrees, less than about 30 degrees, less than about 25 degrees, greater than about 5 degrees, greater than about 10 degrees, greater than about 15 degrees, between about 15 degrees and about 25 degrees, about 20 degrees, or others. The phased array 112 and the reflector 108 can be positioned such that the phased array 112 directs a plurality of signals to the reflector 108 and the reflector 108 reflects the signals at a perpendicular angle. The pad 104 can support the frame 106. The pad 106 can be positioned such that the reflector 108 extends between the pad 106 and the catwalk 110. The pad 106 can be positioned such that the reflector 108 extends between the pad 104 and the phased array 112. The shipping container 118 contains a set of logic (e.g., circuitry, cables, switches, amplifiers, encoders) in control communication with the phased array 112. The pad 104 can support the shipping container 118. The phased array 112 can transmit a circular polarization. The phased array 112 can enable a measurement of an interferometric angle along a vertical axis, where the interferometric angle is associated with the space object. The phased array 112 can enable a measurement of an angle along a horizontal axis, where the angle is associated with the space object. The frame 106 or the catwalk 110 can include a metal or an alloy. The reflector 108 can include a plurality of mesh panels. At least one of the mesh panels can include a metal or an alloy. The catwalk 110 or the reflector 108 can be assembled to the frame (e.g. fastening, mating, interlocking, adhering). The phased array 112 can include a plurality of housings 300 that are separate and distinct from each other. The housings 300 can be positioned along the catwalk 110 longitudinally and linearly. At least one of the housings 300 can host a plurality of antennas 302 linearly spaced apart from each other. At least one of the antennas 302 can be a patch antenna. The housings 300 can be are positioned along the catwalk such that the antennas are linearly co-aligned. At least one of the housings 300 can host a calibration antenna 308. At least one of the housings 300 can host a plurality of patch antennas 302 and a plurality of switches, where the switches are coupled to the calibration antenna 308 and to the patch antennas 302 such that (1) the calibration antenna 308 transmits a first signal and at least one of the patch antennas 302 receives a second signal, and (2) at least one of the patch antennas 302 transmits a third signal and the calibration antenna 308 receives a fourth signal. At least two of the housings 300 can transmit at least two signals between each other. At least one of the housings 300 loops a signal through various portions of an radiofrequency (RF) chain in order to measure or to calibrate a signal phase. The reflector 108 can include a trough with a surface and there can be an antenna 146 embedded into the surface. The antenna 146 can transmit a signal to the phased array 112 such that at least one of a phase of the signal or an amplitude of the signal is measured. The phased array 112 can transmit a signal to the antenna 146 such that at least one of a phase of the signal or an amplitude of the signal is measured. The catwalk 110 can be supported via an A-shaped column. For example, the catwalk 110 can span between a plurality of A-shaped columns. The catwalk 110 can be supported via a non-A-shaped column (e.g. J-shaped, T-shaped, L-shaped, J-shaped, V-shaped, M-shaped, C-shaped, U-shaped, D-shaped). For example, the catwalk 110 can span between a plurality of columns. Regardless of shape, the column can include metal, alloy, plastic, wood, rubber, or other materials. The catwalk 110 can be suspended over the reflector via a plurality of lines (e.g. ropes, cables, chains).

As shown in FIGS. 1-33, there can be a system comprising: a parabolic reflector 108; and a phased array 112 including a first housing 300 and a second housing 300. The first housing 300 can hosts a plurality of first patch antennas 302 facing the parabolic reflector 108, where the first patch antennas 302 are linearly spaced apart from each other. The second housing 300 can hosts a plurality of second patch antennas 302 facing the parabolic reflector 108, where the second patch antennas 302 are linearly spaced apart from each other. The first housing 300 can be positioned adjacent to the second housing 300 such that the first patch antennas 302 and the second patch antennas 302 are linearly co-aligned and receive a plurality of signals via the parabolic reflector 108. The signals is a plurality of first signals and the first housing 300 is positioned adjacent to the second housing 300 such that the first patch antennas 302 and the second patch antennas 302 are linearly co-aligned and transmit a plurality of second signals via the parabolic reflector 108. The phased array 112 can be a 1D phased array.

As shown in FIGS. 1-33, there can be a system comprising: a first assembly including a first frame 106, a first reflector 108 supported via the first frame 106, a first catwalk 110 extending over the first reflector 108, and a first phased array 112 supported via the first catwalk 110 and directed at the first reflector 108. The first phased array 112 can transmit a plurality of first signals via the first reflector 108 and the first phased array 112 receives a plurality of second signals (e.g., reflections off the space object based on the first signals) via the first reflector 108. The system can comprise a second assembly including a second frame 106, a second reflector 108 supported via the second frame 106, a second catwalk 110 extending over the second reflector 108, and a second phased array 112 supported via the second catwalk 110 and directed at the second reflector 108. The second phased array 112 does not transmit any signals via the second reflector 108 and the second phased array 112 receives a plurality of third signals (e.g., reflections off the space objects based on the first signals) via the second reflector 108. The first signals are transmitted off-vertical in a general direction, wherein the second signals and the third signals are received off-vertical in the general direction.

As shown in FIGS. 1-33, there can be a system comprising: a first radar pair 120a including a first assembly and a second assembly. The first assembly includes a first frame 106, a first reflector 108 supported via the first frame 106, a first catwalk 110 extending over the first reflector 108, and a first phased array 112 supported via the first catwalk 110 and directed at the first reflector 108. The first phased array 112 transmits a plurality of first signals via the first reflector 108 and the first phased array 112 receives a plurality of second signals (e.g., reflections off the space object based on the first signals) via the first reflector 108. The second assembly includes a second frame 106, a second reflector 108 supported via the second frame 106, a second catwalk 110 extending over the second reflector 108, and a second phased array 112 supported via the second catwalk 110 and directed at the second reflector 108. The second phased array 112 does not transmit any signals via the second reflector 108 and the second phased array 112 receives a plurality of third signals (e.g., reflections off the space object based on the first signals) via the second reflector 108. The system can comprise a second radar pair 120b including a third assembly and a fourth assembly. The third assembly includes a third frame 106, a third reflector 108 supported via the third frame 106, a third catwalk 110 extending over the third reflector 108, and a third phased array 112 supported via the third catwalk 110 and directed at the third reflector 108. The third phased array 112 transmits a plurality of fourth signals via the third reflector 108 and the third phased array 112 receives a plurality of fifth signals (e.g., reflections off the space object based on the fourth signals) via the third reflector 108. The fourth assembly includes a fourth frame 106, a fourth reflector 108 supported via the fourth frame 106, a fourth catwalk 110 extending over the fourth reflector 108, and a fourth phased array 112 supported via the fourth catwalk 110 and directed at the fourth reflector 108. The fourth phased array 112 does not transmit any signals via the fourth reflector 108 and the fourth phased array 112 receives a plurality of sixth signals (e.g., reflections off the space object based on the fourth signals) via the fourth reflector 108. The system can comprise a defined area 110 (e.g. fenced area, enclosed area, raised area, visually distinct area) containing the first radar pair 120a and the second radar pair 120b. The first radar pair 120a is pointed off-vertical in a first direction and the second radar pair 120b is pointed off-vertical in a second direction (e.g., different direction, not overlapping direction, opposing direction) such that a space object can be tracked at a plurality of points (e.g., V-manner).

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

The invention claimed is:

1. A system comprising:
   a defined area; a first frame positioned within the defined area;
   a first trough reflector positioned within the defined area, wherein the first trough reflector is secured to the first frame, wherein the first trough reflector has a first shape, a first longitudinal valley, and a first scale;
   a first one-dimensional (1D) phased array positioned within the defined area, wherein the first 1D phased array is supported by the first frame over the first trough reflector such that the first 1D phased array sends a set of signals via the first trough reflector and receives a set of reflections based on the set of signals via the first trough reflector; a second frame positioned within the defined area;
   a second trough reflector positioned within the defined area, wherein the second trough reflector is secured to the second frame, wherein the second trough reflector has a second shape, a second longitudinal valley, and a second scale, wherein the second shape is the first shape, wherein the second longitudinal valley is parallel to the first longitudinal valley, wherein the second scale is lesser than the first scale; and
   a second 1D phased array positioned within the defined area, wherein the second 1D phased array is supported by the second frame over the second trough reflector such that the second 1D phased array does not send any signals via the second trough reflector and receives the set of reflections based on the set of signals via the second trough reflector.

2. The system of claim 1, wherein the first 1D phased array forms a first line, wherein the second 1D phased array forms a second line, wherein the first line is parallel to the second line.

3. The system of claim 1, further comprising:
   a first leg secured to the first frame within the defined area, wherein the first leg extends over the first trough reflector;
   a second leg secured to the first frame within the defined area, wherein the second leg extends over the second trough reflector; and
   a platform secured to the first leg and the second leg within the defined area, wherein the platform extends over the first trough reflector along the first longitudinal valley, wherein the platform hosts the first 1D phased array.

4. The system of claim 1, wherein the first 1D phased array includes a set of housings positioned on the platform immediately adjacent to each other over the first trough reflector, wherein each member of the set of housings includes a set of antenna elements arranged in a line on that respective housing and facing the first trough reflector.

5. The system of claim 1, further comprising:
   a first leg secured to the second frame within the defined area, wherein the first leg extends over the second trough reflector;
   a second leg secured to the second frame within the defined area, wherein the second leg extends over the second trough reflector;
   a platform secured to the first leg and the second leg within the defined area, wherein the platform extends over the second trough reflector along the second longitudinal valley, wherein the platform hosts the second 1D phased array.

6. The system of claim 5, wherein the second 1D phase array includes a set of housings positioned on the platform immediately adjacent to each other over the second trough reflector, wherein each member of the set of housings includes a set of antenna elements arranged in a line on that respective housing and facing the second trough reflector.

7. The system of claim 1, further comprising:
   a container positioned within the defined area, wherein the container is spaced apart from the first frame, the first trough reflector, the first 1D phased array, the second frame, the second trough reflector, and the second 1D phased array, wherein the container has an internal area sized for a user to walk therein; and
   a logic positioned within the internal area, wherein the logic is in communication with the first 1D phased array and the second 1D phased array such that the logic controls the first 1D phase array and the second 1D phased array.

8. The system of claim 7, wherein the logic includes a processor positioned within the container, a transmitter positioned within the container, a set of radio frequency (RF) receivers positioned within the container, and a networking interface positioned within the container, wherein the transmitter and the set of RF receivers are communicably positioned between the processor and the networking interface.

9. The system of claim 7, further comprising:
   a signal splitter coupled to the logic and the first 1D phased array such that the set of signals is generated based on the signal splitter receiving a set of data from the logic and splitting the set of data.

10. The system of claim 1, wherein the first 1D phased array sends the set of signals via the first trough reflector based on a first circular polarization and receives the set of reflections via the first trough reflector based on a second circular polarization, wherein the first circular polarization is not identical to the second circular polarization.

11. The system of claim 10, wherein the first circular polarization is opposite the second circular polarization.

12. The system of claim 10, wherein the second 1D phased array receives the set of reflections via the second trough reflector based on the first circular polarization and the second circular polarization.

13. The system of claim 1, wherein the set of signals is a first set of signals, wherein the set of reflections is a first set of reflections, and further comprising:
   a third frame positioned within the defined area;
   a third trough reflector positioned within the defined area, wherein the third trough reflector is secured to the third frame, wherein the third trough reflector has a third shape, a third longitudinal valley, and a third scale;
   a third 1D phased array positioned within the defined area, wherein the third 1D phased array is supported by the third frame over the third trough reflector such that the third 1D phased array sends a second set of signals via the third trough reflector and receives a second set of reflections based on the second set of signals via the third trough reflector;

a fourth frame positioned within the defined area;

a fourth trough reflector positioned within the defined area, wherein the fourth trough reflector is secured to the fourth frame, wherein the fourth trough reflector has a fourth shape, a fourth longitudinal valley, and a fourth scale, wherein the fourth shape is the third shape, wherein the fourth longitudinal valley is parallel to the third longitudinal valley, wherein the fourth scale is lesser than the third scale; and a fourth 1D phased array positioned within the defined area, wherein the fourth 1D phased array is supported by the fourth frame over the fourth trough reflector such that the fourth 1D phased array does not send any signals via the fourth trough reflector and receives the second set of reflections based on the second set of signals via the fourth trough reflector, wherein the second trough reflector is positioned between the first trough reflector and the fourth trough reflector, wherein the fourth trough reflector is positioned between the second trough reflector and the third trough reflector, wherein the first set of reflections forms a first field of view and the second set of reflections forms a second field of view, wherein the first field of view does not overlap with the second field of view.

14. The system of claim 13, further comprising:
a processor in communication with the first 1D phased array, the second 1D phased array, the third 1D phased array, and the fourth 1D phased array, wherein the processor is programmed to:
track a space object traveling on an orbit within the first field of view and the second field of view such that the space object traveling on the orbit can be detected from within the defined area at least twice in a single pass over the defined area.

15. The system of claim 13, wherein the second longitudinal valley is parallel to the fourth longitudinal valley.

16. The system of claim 13, wherein the first longitudinal valley is parallel to the third longitudinal valley.

17. The system of claim 13, wherein the second longitudinal valley is not parallel to the fourth longitudinal valley.

18. The system of claim 13, wherein the first longitudinal valley is not parallel to the third longitudinal valley.

19. The system of claim 13, further comprising:
a processor in communication with the first 1D phased array, the second 1D phased array, the third 1D phased array, and the fourth 1D phased array, wherein the processor is programmed to:

cause the first 1D phased array and the second 1D phased array to detect a space object within the first field of view based on the first set of reflections, determining an initial orbit for the space object based on the first set of reflections, create a schedule for the third 1D phase array and the fourth 1D phased array to detect the space object after the initial orbit for the space object is determined, cause the third 1D phased array and the fourth 1D phased array to detect the space object within the second field of view based on the second set of reflections according to the schedule, and take an action associated with the initial orbit responsive to the space object being detected within the second field of view based on the second set of reflections according to the schedule.

20. The system of claim 19, wherein the action includes modifying the initial orbit such that a new orbit is formed.

21. The system of claim 19, wherein the action includes keeping the initial orbit as is.

22. The system of claim 19, wherein the action includes creating a new orbit based on the initial orbit.

23. The system of claim 19, wherein the processor determines the initial orbit for the space object that is not listed in a record of a set of records in a database remote from the processor, wherein the set of records corresponds to a set of space objects other than the space object.

24. The system of claim 19, wherein the processor determines the initial orbit for the space object that is recorded in a record of a database remote from the processor, wherein the record lacks an orbit parameter corresponding to the space object for a predetermined time period.

25. The system of claim 1, further comprising:
a processor in communication with the first 1D phased array and the second 1D phased array, wherein the processor is programmed to:
perform a radar interferometry for a space object detected based on the first 1D phased array sending the set of signals via the first trough reflector towards the space object and receiving the set of reflections off the space object by the first 1D phased array via the first trough reflector and by the second 1D phased array via the second trough reflector.

26. The system of claim 23, wherein the radar interferometry includes converting a set of time series from a set of independent data channels into a best-fit range, a radial velocity, a radial acceleration, and an x/y offset position.

* * * * *